United States Patent [19]
Fishkin et al.

[11] Patent Number: 6,160,540
[45] Date of Patent: Dec. 12, 2000

[54] ZOOMORPHIC COMPUTER USER INTERFACE

[75] Inventors: Kenneth P. Fishkin, Redwood City; David Goldberg, Palo Alto; Anuj Uday Gujar, Palo Alto; Beverly L. Harrison, Palo Alto; Elizabeth D. Mynatt, San Francisco; Maureen C. Stone; Roy Want, both of Los Altos, all of Calif.

[73] Assignee: Xerox Company, Stamford, Conn.

[21] Appl. No.: 09/005,977

[22] Filed: Jan. 12, 1998

[51] Int. Cl.[7] .................................................. G09G 5/00
[52] U.S. Cl. ..................... 345/184; 345/156; 434/393; 463/30; 463/37
[58] Field of Search .................................. 345/320, 321, 345/322, 323, 324, 325, 326, 327, 328, 329, 156, 157, 158, 159, 160, 161, 162, 163, 164, 165, 166, 167, 168, 179, 184; 434/393, 433; 273/460; 463/1, 7, 30, 37

[56] References Cited

U.S. PATENT DOCUMENTS

| | | | |
|---|---|---|---|
| 4,668,861 | 5/1987 | White ........................................ | 250/227 |
| 5,157,384 | 10/1992 | Greanias et al. ......................... | 340/706 |
| 5,262,777 | 11/1993 | Low et al. ................................. | 341/20 |
| 5,389,945 | 2/1995 | Sheridon .................................... | 345/85 |
| 5,396,265 | 3/1995 | Ulrich et al. .............................. | 345/158 |
| 5,481,265 | 1/1996 | Russell et al. ............................. | 345/157 |
| 5,483,261 | 1/1996 | Yasutake et al. ......................... | 345/173 |
| 5,659,691 | 8/1997 | Durward et al. .......................... | 395/329 |
| 5,825,308 | 10/1998 | Rosbenberg et al. .................... | 345/145 |
| 5,825,675 | 10/1998 | Want et al. ............................... | 345/168 |
| 5,870,080 | 2/1999 | Burnett et al. ........................... | 345/163 |

OTHER PUBLICATIONS

Ishii, Hiroshi; Ullmer, Brygg. "Tangible Bits: Towards Seamless Interfaces between People, Bits and Atoms." Published in the *Proceedings of CHI '97,* Mar. 22–27, 1997, © 1997 ACM, pp. 1–8.

Rekimoto, Jun. "Tilting Operations for Small Screen Interfaces (Tech Note)." *User Interface and Software Technology (UIST'96)*, 1996, pp. 1–2. http://www.csl.sony.co.jp/person/rekimoto/tilt/.

Small, David; Ishii, Hiroshi. "Design of Spatially Aware Graspable Displays." Published in the *Extended Abstracts of CHI '97,* Mar. 22–27, 1997, © 1997 ACM, pp. 1–2.

Ullmer, Brygg; Ishii, Hiroshi. "The metaDESK: Models and Prototypes for Tangible User Interfaces." Published in the *Proceedings of UIST '97,* Oct. 14–17, 1997, © 1997 ACM, pp. 10.

*Primary Examiner*—Ba Huynh

[57] ABSTRACT

A zoomorphic computer for controlling a computer system includes an animal or humanoid shaped shell having an attached transceiver for two way communication with a computer system. A position detecting unit determines position of the zoomorphic shell relative to the computer system, with change of position of the zoomorphic shell relative to the computer system changing state the zoomorphic shell or the computer system. The zoomorphic shell can have movable elements such as arms or tails, attached to the zoomorphic shell, and support a feedback unit that communicates with the computer system, modifying position of a movable element in response to computer system output.

19 Claims, 28 Drawing Sheets

ZOOMORPHIC COMPUTER USER INTERFACE

FIELD OF THE INVENTION

The present invention relates to a zoomorphic computer user interface. More particularly, the present invention relates to a computer processor and display having animal, human, or object shaped input/output devices for visual, auditory, grasping, gripping, or touching mediated user input.

BACKGROUND AND SUMMARY OF THE INVENTION

Computer input and output is predominantly supported by keyboards and mice for input, along with cathode ray tube (CRT) monitors, flat panel displays, and audio speakers for output. While such input/output devices are both powerful and widely available, they do have limitations. For example, novice computer users are often uneasy in the presence of "high tech" input/output devices, while even skilled computer users may avoid types of computer interactions because of the perceived effort required to accomplish a task.

To overcome adverse perceptions and facilitate common computer interactions such as logging on, providing passwords, or enabling communication applications, the present invention contemplates the use of small auxiliary computers separate and distinct from a user's primary computer. To enhance appeal, such "tangible" computers can be constructed to simulate conventional objects having widespread user recognition. For example, a small, handheld computer used to provide passwords to various applications can be shaped as a stylized key. A user can rotate the key in front of a computer monitor, with internal rotation sensors in the key triggering a wireless sending of a logon and password sequence to "unlock" a computer or computer application.

One particularly useful form of tangible computer is configured to have an animal or human shape. This would include real or fantastic animals (horses or unicorns), doll shapes or action figures, or even imaginary monsters or aliens. Such zoomorphic computers are readily accepted by younger computer users, and easily recognizable by any computer user. Advantageously, a rich symbolic or metaphoric vocabulary is available to guide use of such zoomorphic tangible computers. For example, a growling dog figure can be recognizable as a "guard dog", and may provide a suitable substitute to the stylized key tangible computer for password protection of a main computer.

As those skilled in the art will appreciate, reliably, quickly, and intuitively transmitting complex commands to small tangible or zoomorphic computers can be difficult. Small computer devices do not generally have sufficient computer processing power to respond reliably to voice or handwritten (pen based) commands, keyboards are often absent or too small for accurate finger input, and conventional buttons are too large or support too limited a command instruction set. User interface techniques that rely on bulky external modules (full size infrared linked keyboards, tethered data gloves, or camera based gestural recognition equipment, for example) are expensive, often not readily available outside selected sites, and probably too awkward for widespread use in conjunction with consumer level portable computing devices.

User interface designers for traditional, non-zoomorphic portable computers have attempted to compensate for some of these problems by constructing devices that rely on various spatial, positional, or environmental cues that manually or automatically allow for activation of various modes in the device. For example, some laptop computers use the action of opening/closing the lid to initiate automatic bootup/powerdown of the computer without requiring any additional signal input (e.g. such as depressing a "start" button or typing "I_o_g_o_n" on a keyboard) from a user. Alternatively, the use of small portable computers that automatically switch control modes depending on position, orientation, or room location have been investigated. Buttonless manual control of a portable computer through deliberate user actions such as tilting the portable computer have also been described.

However, all these solutions for interfacing with small portable computers have generally been limited in scope and functionality. What is needed is a user interface system suitable for even very small portable computers (having volumetric dimensions on the order of a one cubic centimeter) that is powerful, can be intuitively operated by an ordinary user with little training, and is still readily capable of modification or extension by the user. The present invention meets these requirements by providing a manipulatory user interface that responds to a user twisting, folding, bending, squeezing, shaking, tilting, spinning, lifting, or otherwise physically manipulating the zoomorphic computer.

In the manipulatory user interface system of the present invention, the most basic level of manipulation is known as a "senseme". A senseme is defined as a single indivisible type of physical manipulation. A partial list of categories of sensemes include material transformations such as squeezing, twisting, stretching; local spatial transformations such as translation, rotation, orbiting; and environmental transformations based on temperature, light level, or vibration. For example, a small portable computer may support a deformable piece having multiple embedded sensors that detect folding, twisting, or bending of the deformable piece by a user. This computer can also contain a number of accelerometers that sense relative spatial information; gyroscopic, radio or infrared positional sensors for determining absolute position; and various thermal or photosensors that respectively detect temperature and light level changes. Intentional or unintentional modifications detected by one or more of these sensor systems can provide the basis for a powerful user interface scheme.

As will be appreciated, each senseme category contains many individually distinguishable members. For example, consider the category of senseme known as a "pinch", a structural transformation generally completed by a user squeezing the deformable piece between a forefinger and thumb. A pinch can be modified by varying its speed (quick or slow pinch), magnitude/intensity (light or hard pinch), portion of deformable piece pinched (top, bottom, or center of deformable piece pinched), or even portion of body used to pinch (right handed pinch or left handed pinch), with each modification being distinguishable as a senseme capable of being mapped onto a computer control command.

Although the wide variety of easily distinguishable sensemes would alone provide a powerful user interface to a computer, the present invention further extends the flexibility of the senseme based user interface by supporting computer control based on a "morpheme" input. The morpheme is a temporally synchronous (or overlapping asynchronous) tuple of one or more sensemes. Note that a morpheme can (and often will) contain more than one senseme. The sensemes combined into a morpheme can come either from the same category (the user pinches with a right hand while tapping with a left hand finger), or different categories (the user pinches the deformable piece with a right hand while modifying the spatial position of the portable computer by tilting it forward).

Any morpheme can in turn be extended by participation in a "sentence. A sentence is defined as a sequence of one or more temporally disjoint morphemes. The sentence level allows definition of a physical manipulatory grammar by appropriate choice of morpheme sequence, and corollary rules governing, for example, use of active (verb like) morphemes, naming (noun) morphemes, or connectors. Other possible grammar constructs used in sentences may include those based on "home" systems. Home systems are general-purpose gestural languages, whose grammar and syntax are not borrowed in any way from a host language. Examples of these languages are gestural languages developed by deaf children of hearing parents who have not been exposed to American Sign Language (ASL), and the "plains talk" of North American Indians, which was used as a trade language.

Accordingly, the present invention provides a method for inputting information to a computer connected to a deformable piece that can be manipulated, and optionally to various position sensors (both relative and absolute), pressure sensors, thermal sensors, or even light sensors. The method comprises the steps of manipulating the deformable piece to provide a first morpheme input to the computer, with the first morpheme input normally triggering a first default action by the computer. The deformable piece may also be manipulated to provide a second morpheme input to the computer, with the second morpheme input converting the normally triggered first default action to a second action. The first and second morphemes (and any subsequent morphemes) together form a sentence that can be interpreted as a command to implement a computer controlled action, whether it be to unlock an electronically controlled door, display a graphical image on a computer display, or begin logging on to a computer network. Advantageously, such a user interface system is well suited for interaction with small computer devices, and may even be cross-cultural to a limited extent, with ability to squeeze or pinch being universal human attributes.

The present invention is particularly useful for portable computers that can be held in the palm of a hand. If the portable computer is partially or completely surrounded with a deformable material having embedded or contact pressure/deformation sensors, a user is able to gesture with or manipulate the whole computer in order to achieve some desired result. Material deformation can be implemented at various scales. For instance, a computer and connected deformation sensors mounted inside a flexible tube could respond to right angle bending of the tube, or even complex knotting or looping of the tube. In practice however, only minute surface deformations are required, being just sufficient to provide tactile feedback to pressing, pinching, or bending type manipulations. In either case, however, the measurement of location and pressure applied to a surface is sufficient to characterize the mode of interaction (distinguishing a pinch from a prod).

One particularly preferred embodiment of a handheld portable computer that responds to a physical manipulatory grammar in accordance with the present invention includes a computer, a feedback module to provide visual, auditory, or tactile feedback to a user (e.g., processor connected LCD display, audio speaker, or tactile display to present Braille or other conventional touch interface), and co-mounted graspable, deformable piece partially or completely surrounding the feedback module. In addition, various thermal or pressure sensors are mounted to detect handedness of a user, with the grasping hand generally being the non-dominant hand for the user. Depending on the handedness of the user (which can be considered as a morpheme), the displayed data structure is modified. For example, text displayed on an LCD display screen may be automatically shifted rightward on the screen to allow pen based annotation on the left side of the screen, thereby aiding left handed users.

Physically manipulatable user interfaces additionally provide an opportunity for multiple devices to interact in a user friendly manner. For example, a tileable display system having multiple displays with touch sensitive deformable pieces surrounding the display can be used to organize documents based on relative position of contact of each display. For example, if two displays initially showing separate data structures (e.g two different pages from two different electronic books) are brought together in side by side touching contact, the displayed visual information can alter (e.g. by displaying adjacent pages of a single electronic book). As will be appreciated, one can also use multiple computers connected to physically manipulatable control elements to construct complex commands for organizing data structures.

Additional functions, objects, advantages, and features of the present invention will become apparent from consideration of the following description and drawings of preferred embodiments.

DETAILED DESCRIPTION OF THE DRAWINGS

Figure 1:
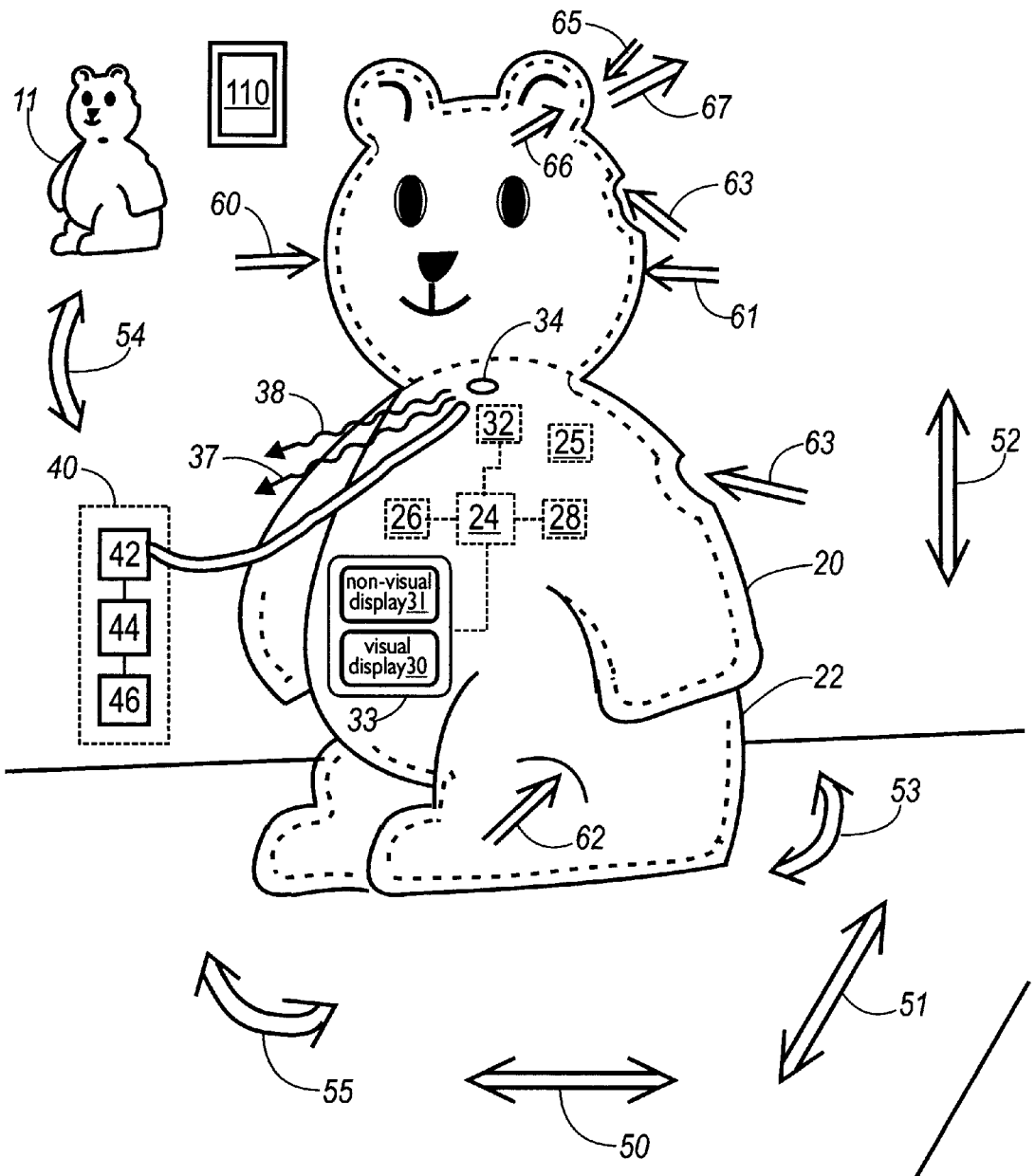
FIG. 1 is a schematic diagram of zoomorphic computer in a shape of a teddy bear, the bear supporting visual and non-visual status displays, and a pressure sensor array for detecting surface deformations.

FIG. 1 illustrates a teddy bear shaped zoomorphic embodiment of the present invention suitable for supporting a morphemic user interface grammar. Support of the grammar can require detection of a user's physical manipulation of a zoomorphic device, detection of relative or absolute spatial location of the device, detection of various environmental factors acting on the device, and even detection and interaction with multiple devices or external computer networks. As illustrated, a zoomorphic device 10 has a deformable surface 20 with an underlying deformation sensor mesh 22 for detecting surface deformation across or within multiple subregions of the deformable surface 20. The deformation sensor mesh 22 is connected to an internally contained processor 24 having associated memory system 26. For detecting various positional or environmental variables, a sensing system 28 is also provided. The illustrated device further includes a feedback module 33, which may include an externally visible status display 30 or a non-visual feedback module 31 (typically delivering auditory or tactile feedback). In the illustrated device, a communications system 32 for reception or transmission of information to other electronic or computing devices is also provided. All these components can be powered by a power supply 25, which is usually an internally mounted rechargeable battery of conventional construction.

Whatever the shape of device 10, for operation of the present invention the device 10 is completely or partially enveloped by the deformable shell or surface 20. The present invention supports use of a great variety of designs and materials for the deformable surface 20, depending on the required plasticity, durability, longevity, and of course, cost constraints. For example, contemplated designs for deformable surface 20 include, but are not limited to:

plush cloth or textile material, optionally supported by foam or plastics, including closed or open celled polymeric foam material having a wall thickness of millimeters to centimeters, with thinner walled embodiments being supported (e.g. by adhesive attachment) by an internal hard shell (constructed from polymeric or metallic materials), and those thicker walled embodiments directly supporting (by, e.g. brackets or supports) internal components such as processor 24. Suitable foams may include those composed in whole or in part of widely available synthetic rubbers such as polychloroprene (neoprene), polystyrenes, rubber or nitrile rubber latex foams, polysiloxanes, block polymers including styrene-butadiene or styrene isoprene, or any other conventional material having good elasticity and deformability;

a thin single layer polymeric surface loosely wrapped around a internal hard shell (the hard shell being constructed from polymeric or metallic materials). For example, a nylon or cotton weave, single layer polyethylene, synthetic rubber (with little or no foam cells present), or natural polymeric materials such as leather wrapped around a polystyrene casing can be used;

a composite layered surface having a durable polymeric outer layer supported by an inner foam layer; or even a polymeric bilayer having an intermediate fluid or gel layer of a viscous or thixotropic material that can be used to support extreme deformations. The intermediate layer can be relatively thick (one the order of centimeters), or in certain embodiments can have a thickness measured on micron to millimeter scales. Such extremely thin layers would allow complex twisting, folding, curling, or crumpling actions, and have been described in conjunction with U.S. Pat. No. 5,389,945, assigned to Xerox Corp., the disclosure of which is herein specifically incorporated by reference.

The deformation sensor mesh 22 can be embedded within, or positioned to contact, the deformable surface 20. The deformation sensor mesh 22 can include an array of individual compressional or tensional strain sensors, or alternatively, embedded or attached positional sensors. For certain applications, continuous sensors (e.g. bilayer sheets of capacitance sensors) may be employed. One particularly useful continuous sensor type uses multiple capacitance or resistance strips, with deformation pressure resulting in a positionally localizable analog signal proportional to the applied deformation pressure. Various sensor types can be used, including simple capacitance sensors, resistive strain sensors, analog or digital pressure switches, inductive sensors, or even fluid flow sensors. Depending on the sensor type employed, sensor data can be directly fed to the processor 24 in digital form, or be transformed to digital format by an general purpose analog/digital converter that typically provides a 4 or 8 bit range (although as few as one or as many as 32 bits may be required by various applications). An analog to digital converter may be internal to the processor 24 or provided as an external module. As will be appreciated, the sensor mesh 22 is intended to include combinations of sensors and sensor types, which can be used over the whole or part of the deformable surface 20.

A positional or environmental sensor system 28 can also be supported by zoomorphic device 10. Various sensor modes can be supported, including absolute or relative positional information as determined by gyroscopic sensors, accelerometers, or acoustic or infrared ranging techniques. Environmental sensors, including conventional light, image, thermal, electromagnetic, vibratory, or acoustic sensors can also be present. Depending on the desired application, even costly environmental or positional sensors such as those incorporating differential GPS positioning, image analysis or recognition, acoustic or voice identification, or differential thermal sensors can be used as morphemic input. Such morphemic input, taken in conjunction with morphemic input as detected by sensor mesh 22, can enhance precision and flexibility of a user's control of zoomorphic device 10.

As illustrated, both sensor system 28 and sensor mesh 22 are connected to the processor 24 and associated memory 26. The processor 24 and memory 26 are typically mounted within the deformable surface 20, by either direct attachment to the deformable surface 20 or by attachment to a hard casing positioned within the deformable surface 20. Conventional CISC or RISC processors can be used in the illustrated embodiment, with low power processors such as the Signetics 87c752 or 87c751, Motorola 68HC11 or 68582, or ARM 710 being preferred. If convenient, coprocessors such as analog to digital converters or digital signal processors can be used alone or in conjunction with a main processor. Conventional flash, static, or dynamic RAM can used in the present invention, although for certain applications higher cost embedded DRAM may also be used. In some storage intensive applications, memory 26 can include additional harddisk storage, either located within the device 10 or available through an external connection. As will be appreciated, for many applications use of optional external communications can at least partially supplant use of internal processors and memory (except for that necessary to support required sensor or communication buffering and signalling).

The present invention optionally supports communications with an external computer system 40 using its internal communications system 32 and associated transceiver 34. The external computer system 40 also includes a transceiver 42, a personal computer or workstation 44, and is connected to a local or wide area network computer system 46. The transceivers 34 and 42 can support various communication protocols and designs, including use of a serial tethered line 36 (using, for example the RS-232C interface protocols), use of infrared signals 38 adhering to widely utilized IRDA communication standards, or use of radiofrequency signal 37 (which can be, for example, a cellular telephone, 900 MHz radio, or digital PCS telephonic communications). Alternative communication standards, or even alternative communication carriers such as those based on optical or acoustic techniques, can of course be employed.

As will be appreciated, in addition to direct communication with external computer system 40, the device 10 can be directly or indirectly maintained in continuous or intermittent communication with a number of suitably equipped electronic devices, including a tablet computer 110, or even another zoomorphic portable computer 11 similar function to device 10. Communication can be direct to a target device, or through an intermediary retransmitter such as computer system 40. Other possible communication targets include automation control systems, security authorization units, personal digital assistants, notebook computers, or any other suitably equipped electronic system.

Results of communications with external devices, presentation of device stored information, or device status updates can all be provided to a user through processor 24 controlled update of feedback module 33. Feedback to a user can be primarily visual, such as can occur in conjunction with visual display 30. Generally, the display 30 can be a conventional passive or active matrix liquid crystal display, although use of more sophisticated (and expensive) displays based on various electrooptical or micromechanical techniques can of course be used. In addition, for certain devices a non-imaging display such as may be formed by a small number of status lights (e.g. red or green LEDs), or localized or distributed chromatic changes (in conjunction with a deformable surface 22 constructed with suitable electrochromic materials) may be all that is necessary for visual feedback to the user.

In some embodiments of the invention, visual output through display 30 may be augmented (or even replaced) with a non-visual display 31. The non-visual display 31 can include tactile displays based on internal actuators, auditory feedback, or even displays based on conformal changes in device appearance. For example, one possible feedback display is based on internal auditory speakers (emitting a range of sounds from simple "beeps" to well formed speech, depending on available processor speed and functionality) for providing user feedback. As will be appreciated, non-visual display 31 and its associated actuators or electronics can support alternative feedback modes, including, for example, force feedback to a user through internal actuators, tactile based feedback (e.g with multiple surface projections for presentation of Braille or other conventional tactile user interface), modifications to the surface texture of the device, or any other conventional mechanism for supplying information to a user.

To better appreciate operation of the present invention, some selected modes of physical manipulation of device 10 are schematically presented in FIG. 1. As seen in FIG. 1, device 10 can be translationally moved in three spatial dimensions, as illustrated with reference to orthogonal force arrows 50, 51, and 52. In addition to translational motion, the device 10 can be rotationally moved in any or all three spatial dimensions, as represented by arrows 53, 54, and 55. By use of sensor system 28 (alone or in combination with communication system 32), the relative or absolute position and orientation in three dimensions can be determined.

In addition to determining spatial position and orientation through use of sensors 28, the device 10 can optionally use sensor mesh 22 to measure and localize transient or continuing force application, with force vectors and related timing information being determined and interpreted. A few possible force actions (deformation modes) are schematically illustrated in FIG. 1, with arrows 60 and 61 illustrating depression of surface 20 (with the combination representing a squeeze), arrows 62 and 63 illustrating sliding or rubbing deformation (with the combination representing a twist), and the combination of sliding arrows 65 and 66, and outward pull 67, together representing a pinch and outward pull. The strength of the applied force can be measured (e.g. a hard or soft squeeze is differentiated), its spatial expanse found (e.g. to differentiate between poking with a fingertip or a thumb pad), and timing determined (e.g. to differentiate between a quick or a slow depression of the surface). The deformation so caused may be either permanent or transitory.

As will be appreciated by those skilled in the art, each of the foregoing force actions represented by arrows can be considered a senseme. Some temporally distinguishable sensemes (or combinations of sensemes such as the foregoing discussed pinch/pull combination) further represent morphemes used as a basis for a morphemic grammar in accordance with the present invention. All of the following described morphemes can be modified by numerous variations in applied pressure, force utilized, appendages used, body parts, or extraneous intermediary objects used to apply force. In addition, timing of various objects (whether quick, slow, or alternately quick and slow) can modify interpretation of a morpheme. For example, if "squeeze" is taken as a typical morpheme, one can appreciate various squeeze operations such as quick squeeze, slow squeeze, hard squeeze, soft squeeze, narrow squeeze, wide squeeze, squeeze between hands, squeeze between one hand and a user's chest or head, squeeze between one hand and a table or wall, a squeeze made between two pens or two books, or even a squeeze between a user's tongue and the roof of the mouth. For purposes of the present invention, all such squeeze morphemes would be considered members of the "squeeze" class, with individual variations acting as possible modifiers or selected cases, just as a "house cat" might be considered a particular member of the class of "felines", which more generally embraces lions, tigers, and bobcats.

Figure 2:
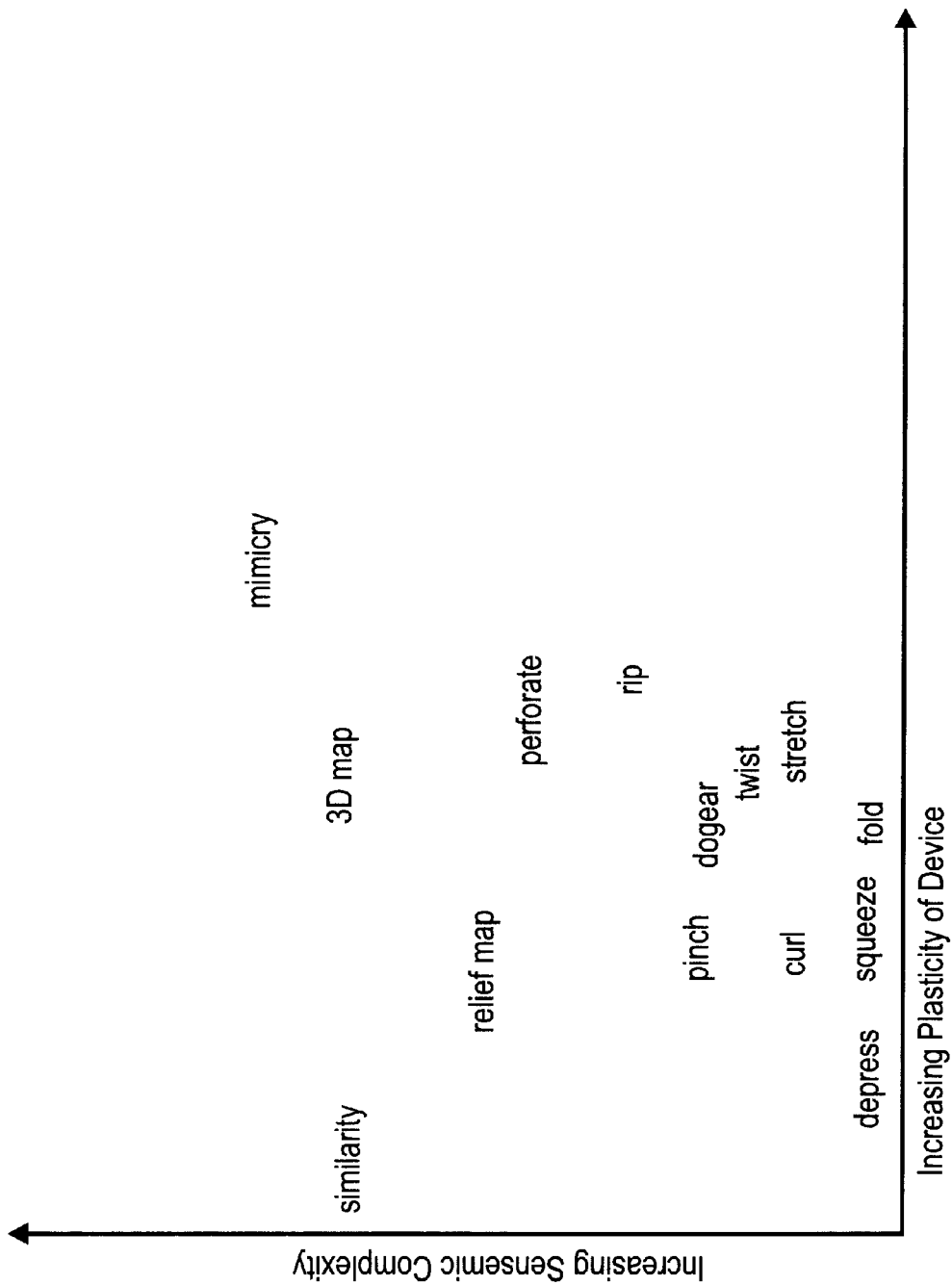
FIG. 2 is a graphical diagram illustrating various physical manipulation morphemes, with axes respectively illustrating complexity of senseme tuples required to form a morpheme, and plasticity of a device required to support the physical manipulation.

To aid in understanding the diversity of contemplated physical manipulation morphemes, FIG. 2 illustrates selected morphemes arranged by increasing plasticity of the device required to enable morpheme utilization, and by increasing complexity of available senseme tuples required to form or interpret a morpheme applied to a particular class of device. Beginning with the least plastic device and the simplest senseme set used to compose a morpheme, a definition of a possible physical manipulation and typical function invoked by that manipulation of a device similar (but of course possibly more complex) to that described in conjunction with FIG. 1 is presented:

DEPRESS

Definition: Indenting one or more subregions of the device through the application of pressure.

Figure 3:
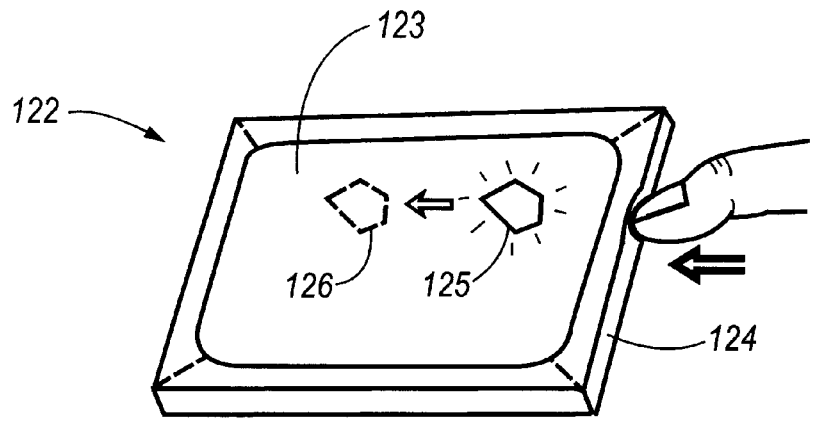
FIGS. 3–16 schematically illustrate various preferred classes of physical manipulation morphemes.

Example: As seen in FIG. 3, consider a device 122 having a display 123. The device 122 supports a graphical illustration software application which allows users to position geometric shapes or user defined graphical objects. The device can have four pads 124 placed around it, one on each side. By deforming a particular side, the user indicates a desire to "nudge" the currently selected geometric shape 125 away from that side to a new position 126.

SQUEEZE

Definition: To deform one or more subregions of a device through the application of vectors of force, some components of which are directed towards each other, which compress the morphological structure of the device. This is a special case of depression.

Figure 4:
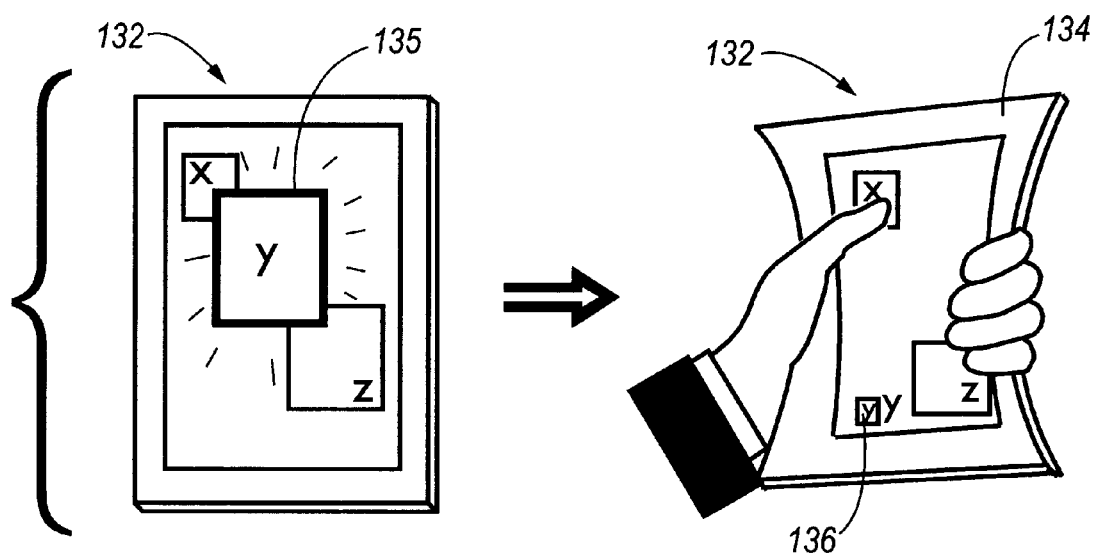

Example: As illustrated in FIG. 4, consider a device 132 which can display one or more documents in either iconic (closed) or textual display (open) modes. By selecting an open document 135, and then squeezing a deformable edge 134 of the device 132, the user indicates a desire to make the document "smaller", in this case to iconize it as icon 136.

FOLD

Definition: To deform a second subregion by bending the first subregion such that it partially or completely overlaps the second subregion. Further deformations can be applied to that new morphological structure on other subregions.

Figure 5:
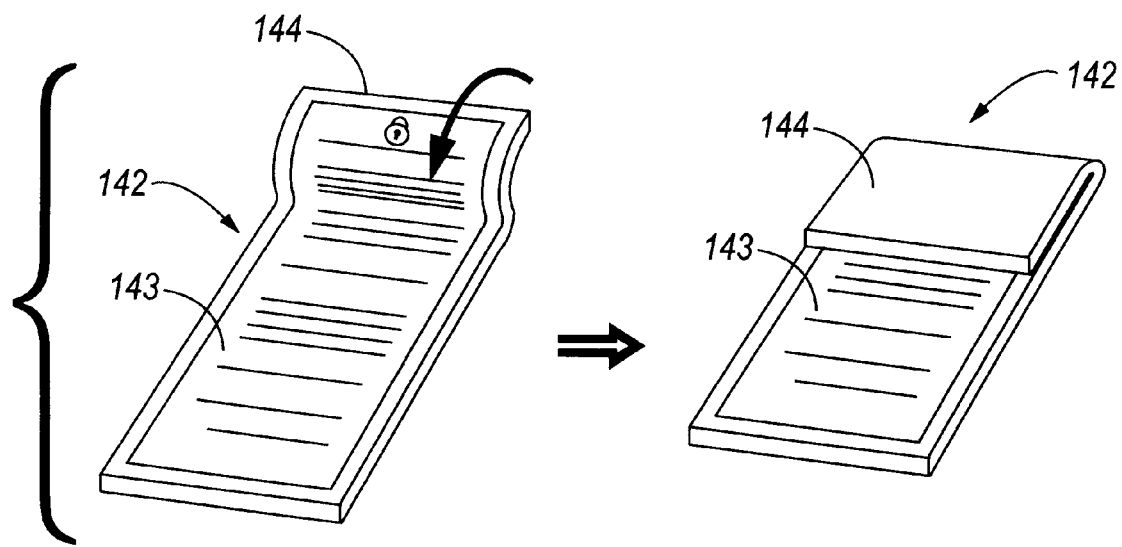

Example: As illustrated in FIG. 5, consider a device 142 which can display documents. Suppose this device 142 has been augmented such that a deformable horizontal "flap" 144 on a top edge of the device 142 can be folded to partially obscure a display 143. When the user makes this folding gesture, the user indicates a desire to password-protect ("hide") the currently displayed document.

CURL

Definition: Deforming one or more subregions of the device by spirally configuring subregions relative to each other in a cylindrical or circular morphological structure.

Figure 6:
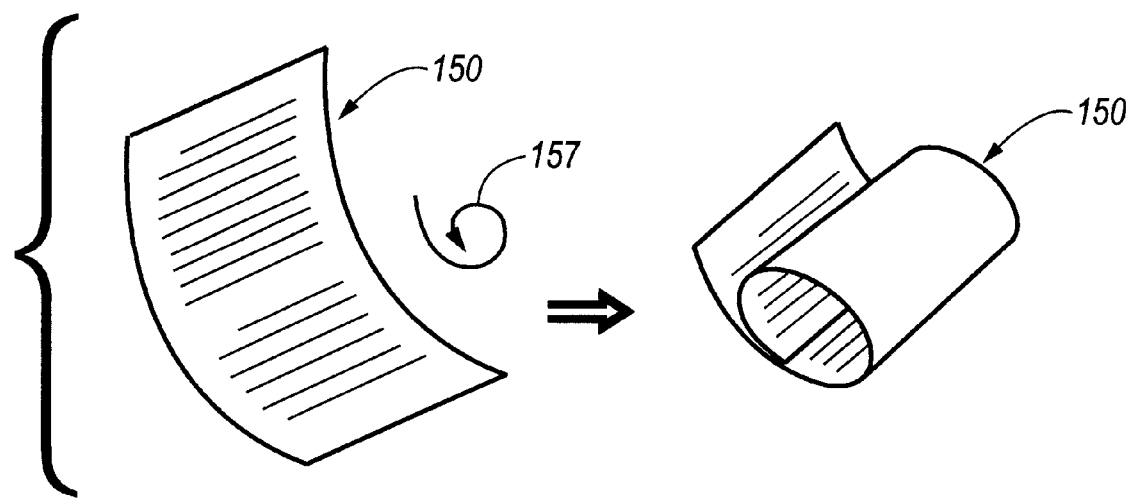

Example: As illustrated in FIG. 6, consider a device 150 which can display documents in various languages (English, French, etc.). When the user takes such a device 150, curls in a direction indicated by arrow 157 into a tube, and then uncurls it, this "abracadabra" gesture tells the device 150 to display the current document in a different language.

STRETCH

Definition: Deforming one or more subregions of a device through the application of vectors of forces, some components of which are directed away from each other, the vectors being applied at opposite ends of the device.

Figure 7:
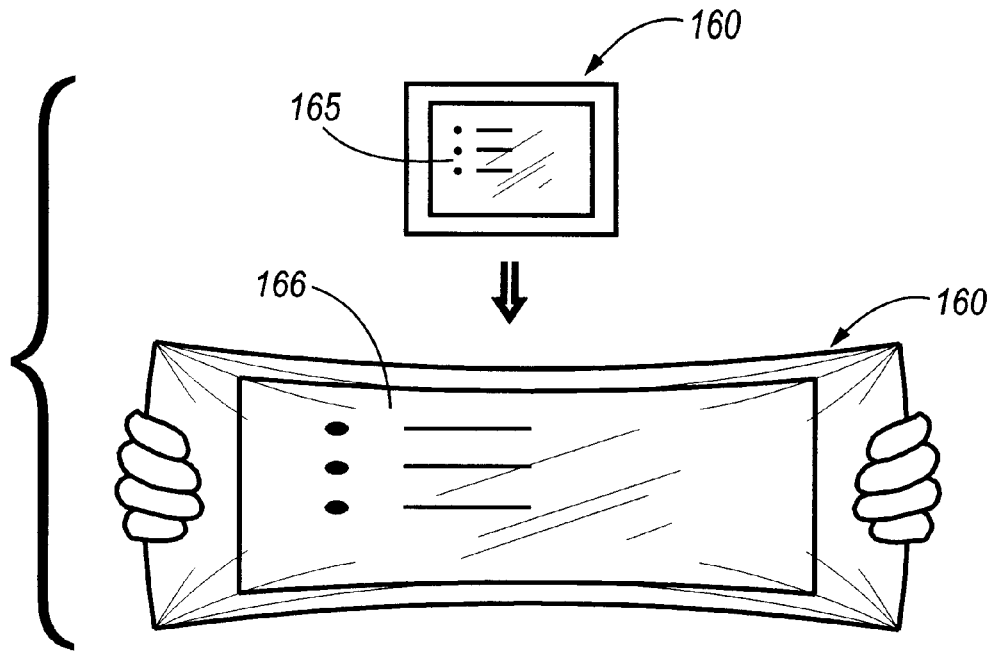

Example: As illustrated in FIG. 7, consider a device 160 with a graphical software application which allows users to manipulate geometric shapes. By stretching the device 160, the user indicates a desire to "resize" or "rescale" the currently displayed shape 165 to a larger size 166, the amount of resizing being a function of the amount of deformation. Note that SQUEEZING can indicate resizing the currently displayed to a smaller size.

PINCH

Definition: Manipulating one or more subregions by applying vectors of forces, aligned directly towards each other, on opposite sides of the affected subregion(s). This is typically, but not exclusively, accomplished using two-finger tactile force. PINCH is a special case of SQUEEZE.

Figure 8:
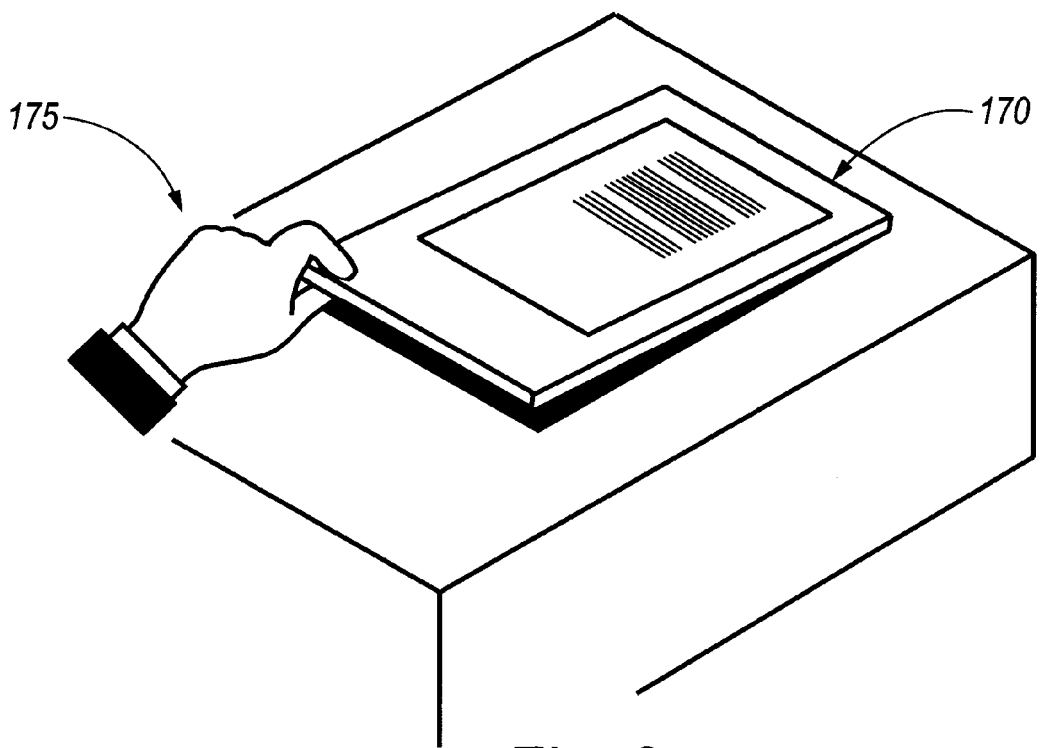

Example: As illustrated in FIG. 8, consider a device 170 which can copy documents. By performing a "pinching" action 175, the user indicates that they wish the next set of copies to be issued in stapled form.

DOGEAR

Definition: Deforming a second subregion by folding a first subregion at a logical corner or edge of the second subregion, indicating a marker or location point (e.g. a bookmark) to be later referenced. DOGEAR is a special case of FOLD.

Figure 9:
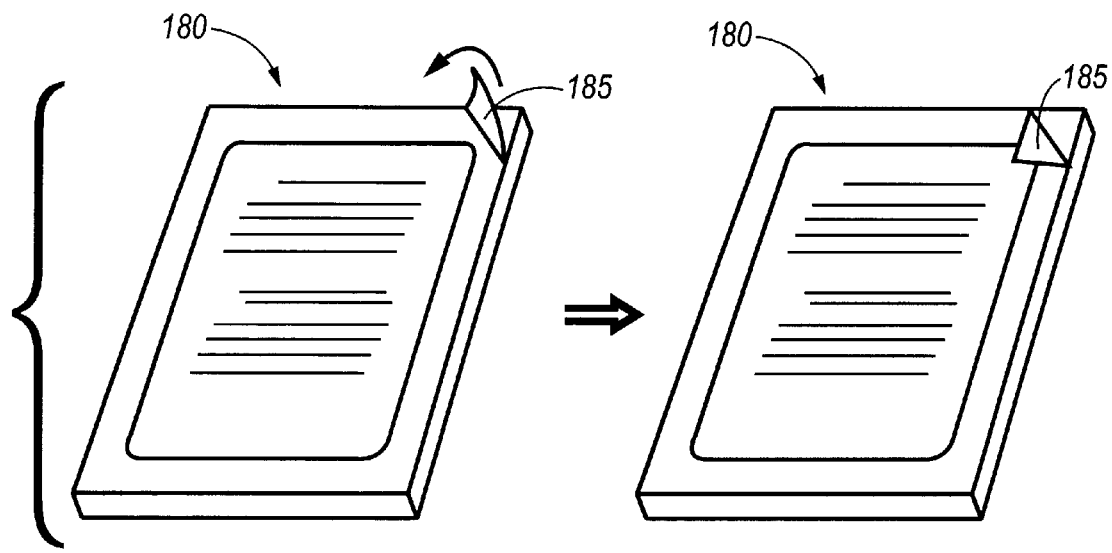

Example: As illustrated in FIG. 9, consider a device 180 which displays a subset of the pages from a multi-page document. By "dogearing" the upper right corner 185 of device 180, the user indicates that they wish a bookmark associated with the currently displayed page or pages.

TWIST

Definition: Deforming one or more subregions of the device through the application of two opposing rotational forces offset from each other by a non-zero difference about some central axis.

Figure 10:
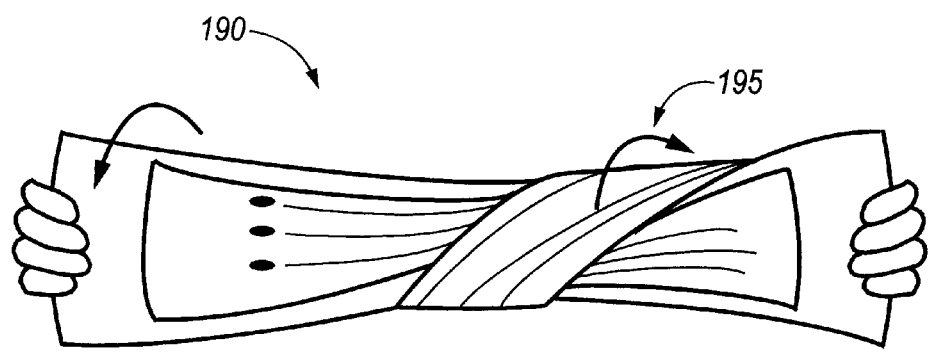

Example: As illustrated in FIG. 10, consider a device 190 which, over time, becomes degraded in some aspect of its performance (its disk becomes fragmented, its memory needs garbage-collection, etc.). By performing a "TWIST" gesture 195, the user indicates that they wish the device to "wring itself out", performing, for example, garbage collection.

RELIEF-MAP

Definition: Deforming one or more subregions of the device by raising and or lowering them by either spatial transformation or the addition/removal of material.

Figure 11:
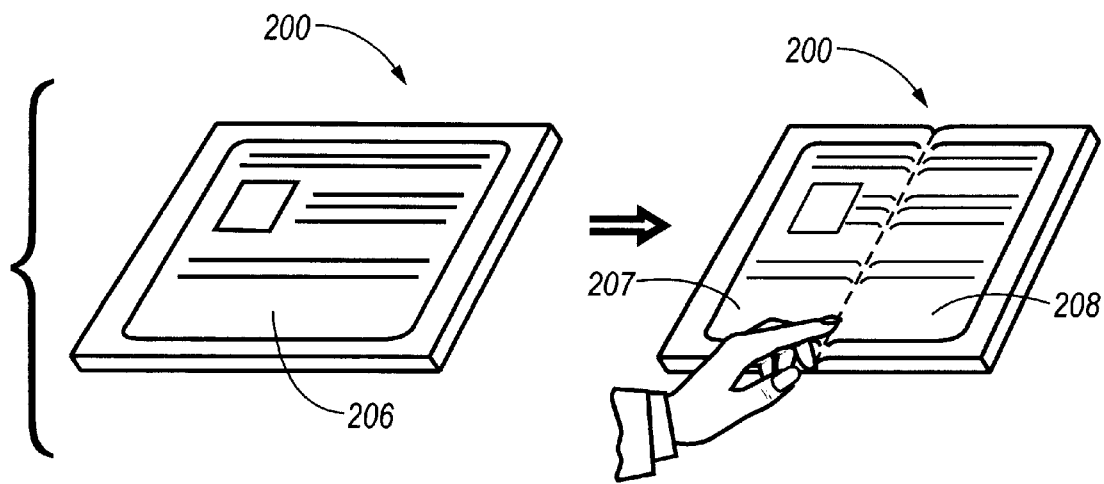

Example: As illustrated in FIG. 11, consider a device 200 which can display documents in either one- or two- page format. When the user "scores" the device by making a vertical indentation about the center axis of the device while it displays a single page 206, the device 200 interprets the morpheme to request display of documents in a two-page format as pages 207 and 208.

RIP

Definition: Deforming one or more subregions of the device by introducing a spatial discontinuity, by applying vectors of force to partially or totally disconnect these subregions from the device.

Figure 12:
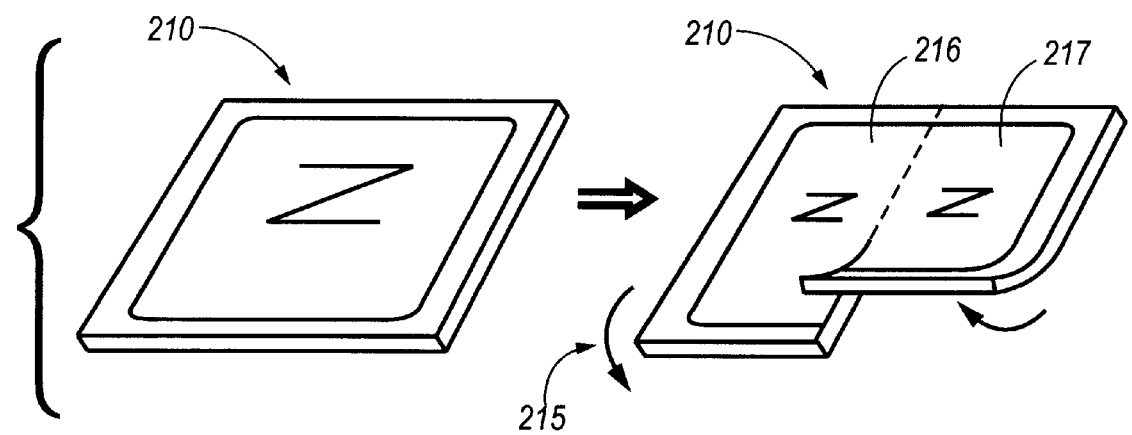

Example: As illustrated in FIG. 12, consider a device 210 which can copy some or all of its information. When the user performs the "ripping" gesture 215, removing one or more subregions, the device 210 copies its currently selected data set onto those subregions 216 and 217.

PERFORATE

Definition: Deforming one or more subregions of the device by means of introducing a change in the spatial connectivity of the subregions such that a hole is introduced (either temporarily or permanently) in the device.

Figure 13:
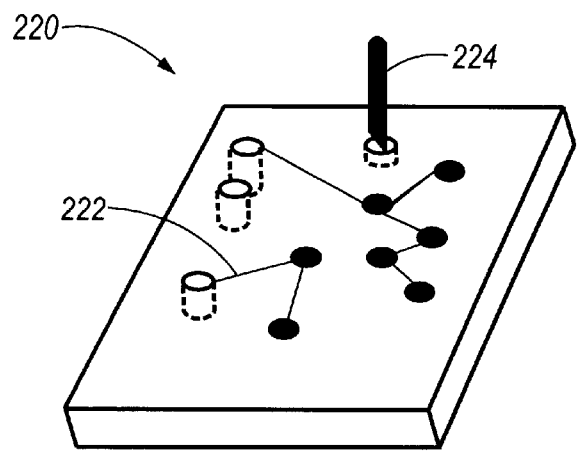

Example: As illustrated in FIG. 13, consider a device 220 which is used to route messages between various parts of a device network, and which displays this functionality to the user by means of lines 222 representing message pathways. When the user perforates the device 220 with a finger or object 224 to introduce a hole in one of these pathways 222, the system stops routing messages along that pathway.

SIMILARITY

Definition: Spatial motion, and/or physical deformation of one or more subregions, of a device previously configured to represent some other predefined object or system. Typically the device acts in a manner consistent with the behavior of the real-world object when it is manipulated in this manner. Such avatars, talismans, or other computationally enabled devices present themselves to a user as a physical instantiation of another object or system. Avatars can be zoomorphic (including animal or human shapes) or configured to mimic real world objects with any desired degree of specificity.

Figure 14:
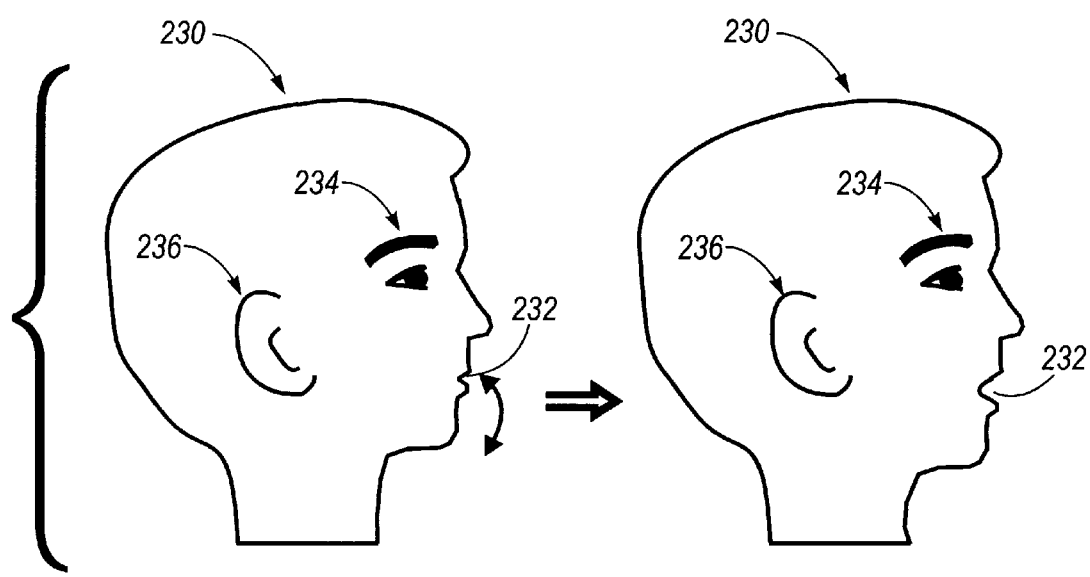

Example: As illustrated in FIG. 14, consider a device 230 capable of text-to-speech audio output, audio input, and visual media presentation. The device 230 presents itself to a user in an anatomically accurate shape of a human head. When the user opens lips 232 on the human head, internal sensors detect opening of the lips and activate text-to-speech capability. When the user covers or closes the eyes 234, associated cameras or video systems are disabled, while covering ears 236 results in disabling audio recording systems.

3D MAP

Definition: The morphing of a device that can be molded around an external object to permit a sensor mesh to determine simultaneously size and shape of the external object The range of possible external objects is large but is limited by the size of the device's solid inner-housing and the volume of the moldable material in the outer housing. In this system the device has the ability to accurately sense the amount of material from its inner surface to the outer edge of the moldable material (example: via ultrasonic sounding, similar to sonar in water) thus determining an accurate electronic model for the shape of the molded enclosure.

Figure 15:
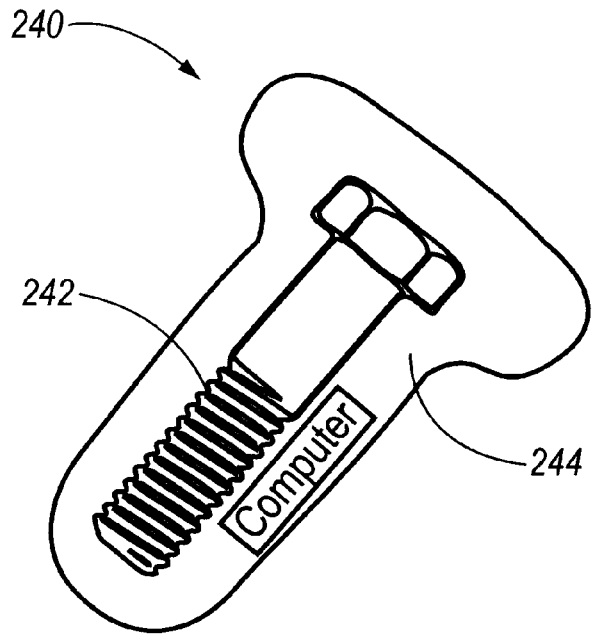

Example: As illustrated in FIG. 15, by pressing a device attached moldable material 244 around the surface of an external object (e.g. a cog 242) a device 240 can automatically generate a CAD model of that object and store it in its memory.

MIMICRY

Definition: Deforming one or more subregions of the device such that the resultant morphological structure resembles a known real-world object and through this association of subregions, the device acts in a manner consistent with the object it resembles.

Figure 16:
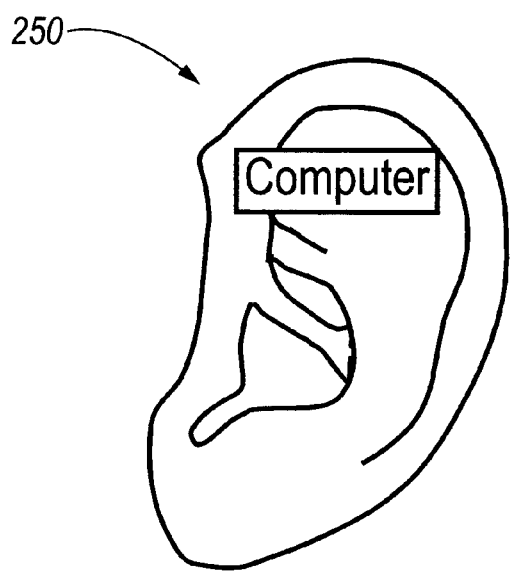

Example: As illustrated in FIG. 16, consider a device 250 containing a computer which contains text-to-speech and audio input capability, and which presents itself to the user as a misshapen blob having the consistency and plasticity of moldable putty or clay. When the user performs the "MIMICRY" action by molding part of the device 250 to resemble an ear, the audio input capability is activated.

Figure 17:
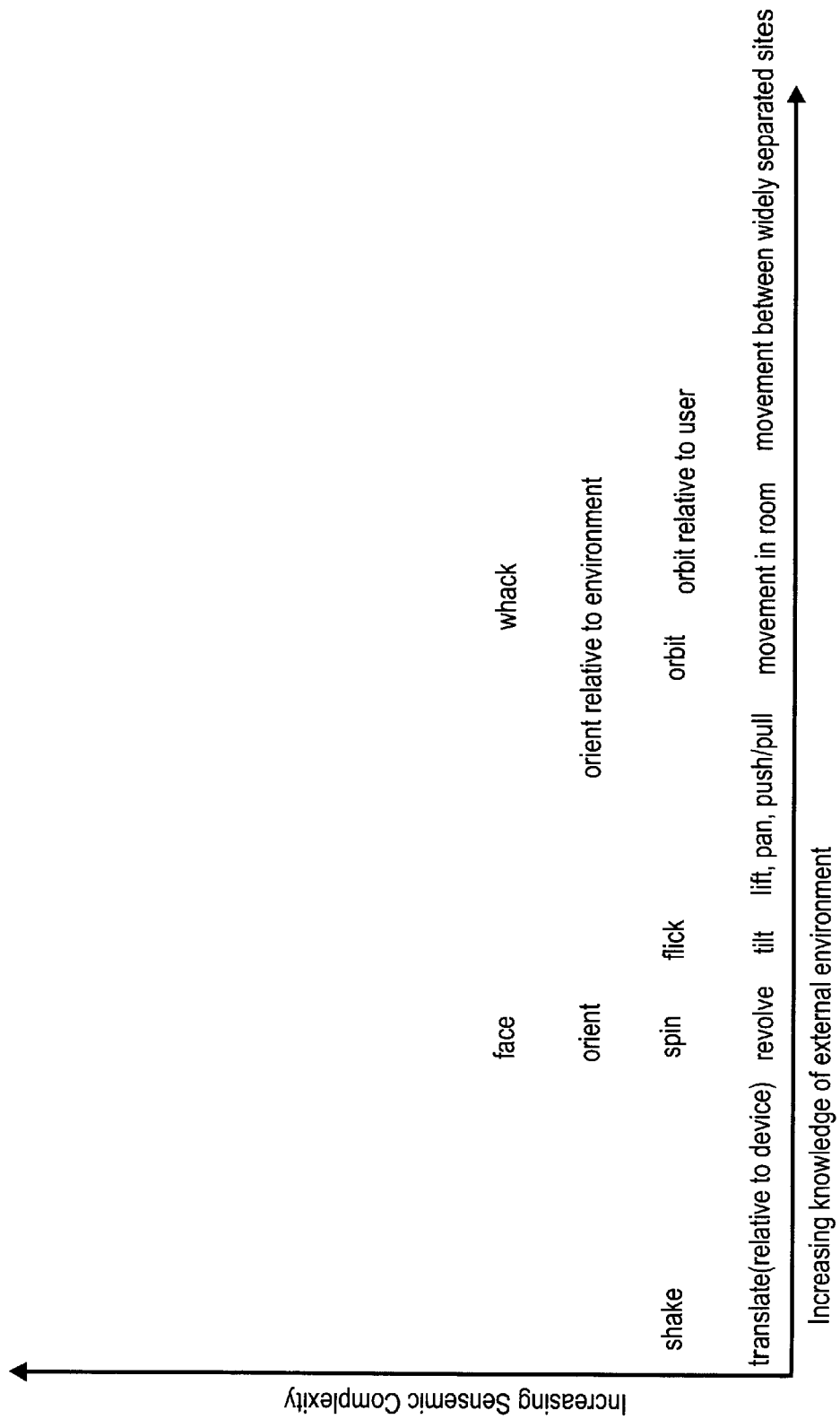
FIG. 17 is a graphical diagram illustrating various spatial morphemes, with a first axis illustrating complexity of senseme tuples required to form a morpheme, and a second axis illustrating the degree of positional information needed to support the physical manipulation (moving along a continuum from relative local measurement along a single specified dimension to absolute global measurement with six degrees of freedom determined)

In addition to morphemes based on physical manipulation, various morphemes based on varying degrees of relative or absolute spatial positioning are contemplated to be useful in practice of the present invention. To aid in understanding the diversity of contemplated spatial morphemes, FIG. 17 illustrates selected spatial morphemes arranged by increasing knowledge of spatial position required to enable morpheme utilization, and by increasing complexity of available senseme tuples required to form or interpret a morpheme applied to a particular class of device. Beginning with a device having only rudimentary relative positioning functionality for supporting simple spatial sensemes, and ending with a device absolutely positionable to within centimeters anywhere on Earth, a definition of a possible spatial manipulation and typical function invoked by that manipulation of a device similar (but of course possibly more complex) to that described in conjunction with FIG. 1 is presented:

TRANSLATE (relative to device)

Definition: The linear movement of a device's center of mass from one position in space to another.

Example: Used to substitute for mouse controlled graphical "sliders" in conventional graphical user interfaces. When it is only physically possible to display a small amount of list, large listings can still be searched by "scrolling" a display window in response to the TRANSLATE morpheme.

SHAKE

Definition: Spatially translating all subregions of a device by repeated movement in opposing directions, such that the net translation is negligible.

Figure 18:
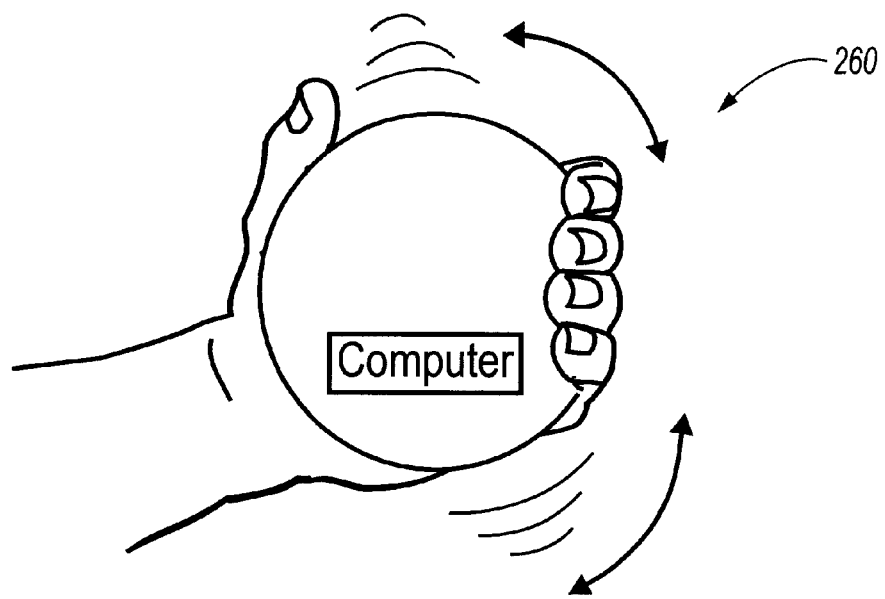
FIGS. 18–26 schematically illustrate various preferred spatial manipulation morphemes.

Example: As illustrated in FIG. 18, consider a device 260 which is used as a calculating device. When the user performs the "SHAKE" gesture, the device 260 clears its accumulator.

REVOLVE

Definition: Rotating all subregions of a device by rotating the subregions about a point internal to the device, about any arbitrary plane.

Figure 19:
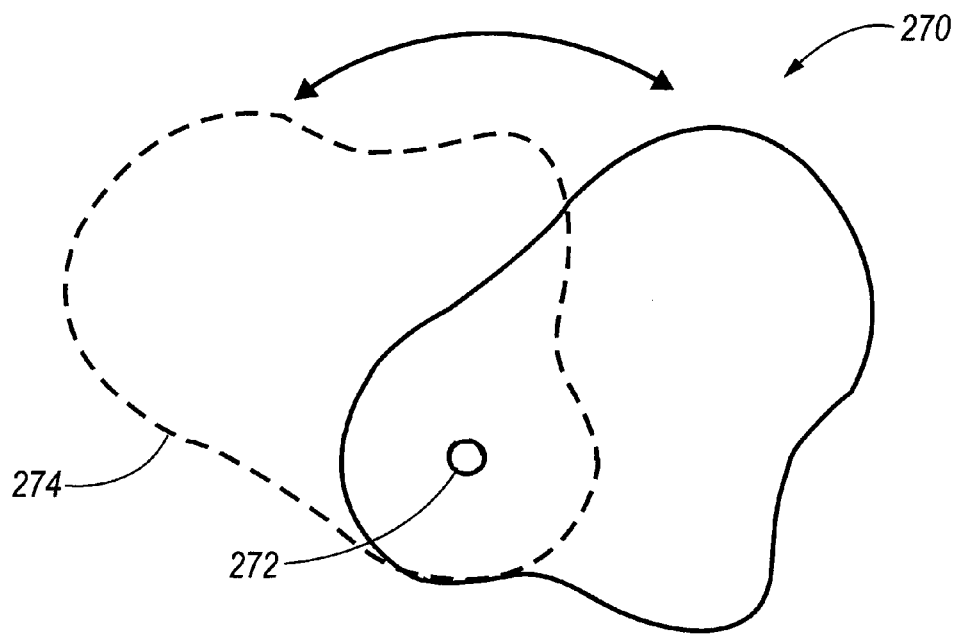

Example: As illustrated in FIG. 19, consider a device 270 which displays an imaged slice of volumetric data, such as medical data from a series of CAT scans. By rotating the device about a center point 272 internal to the device 270 to a new position 274, the plane specifying the imaged slice is changed accordingly.

TILT

Definition: Rotating one or more subregions of a device by rotating the subregions such that one or more components of the rotary force are in the direction of gravity and the amount of rotation is between about −180 degrees and +180 degrees.

Example: Consider a device which displays frames from an animation sequence on the side facing the user. As the device is tilted away, the speed of the animation increases—as its tilted towards the user, the speed of the animation decreases, analogous to operation of a gas pedal.

FLICK

Definition: A forwards TILT immediately followed by an opposing backwards TILT.

Figure 20:
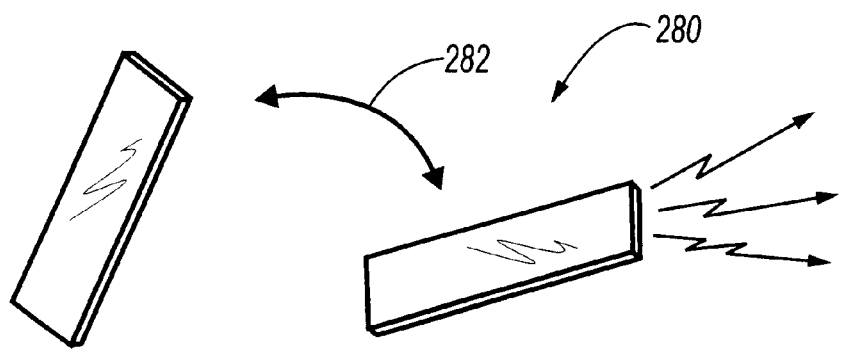

Example: As illustrated in FIG. 20, consider a device 280 which can transmit some subset of its data to another device. When the user performs the "FLICK" gesture by quickly tilting in the direction of arrow 282, followed by a reverse tilt along arrow 282, the device 280 performs this transmission, towards the device (not shown) pointed to by the ray of the gesture.

SPIN

Definition: Rotating one or more subregions of the device by rotating the subregions about a point internal to the device, such that the plane of rotation is one of the device's surface planes. SPIN can be considered a special case of REVOLVE.

Figure 21:
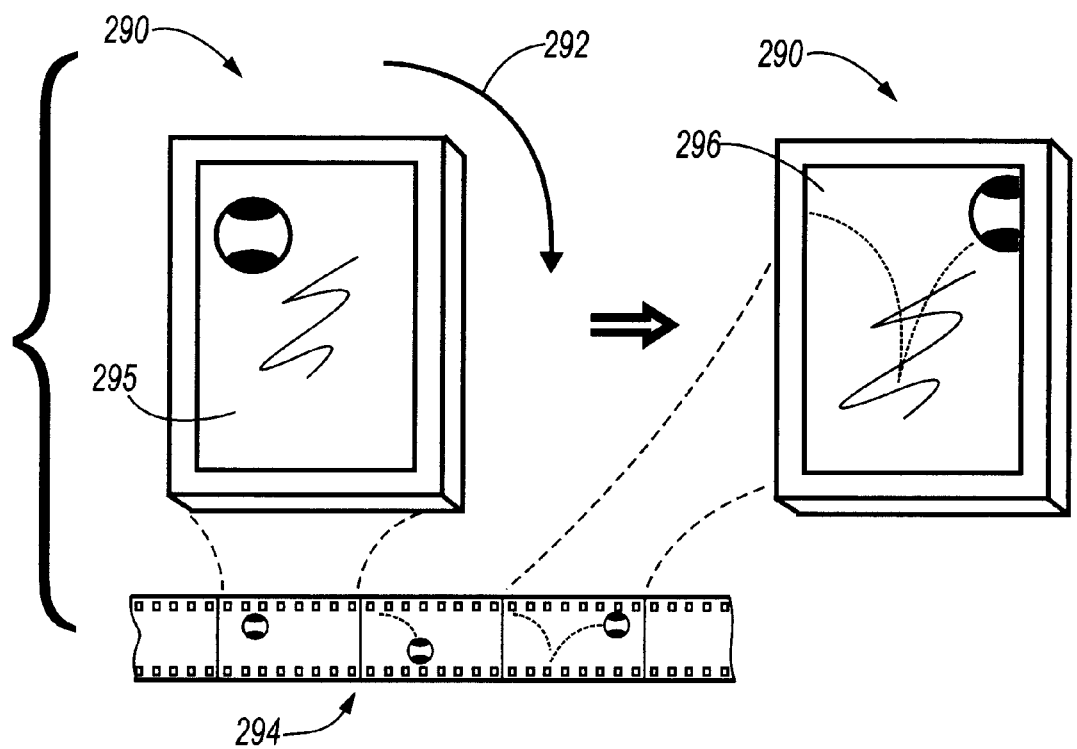

Example: As illustrated in FIG. 21, consider a device 290 which can display a frame of video 295 from a video sequence. The user performs the "SPIN" gesture in a counter-clockwise direction, the device displays earlier frames in the sequence; when the gesture is performed in a clockwise direction (arrow 292), the device 290 displays a later frame 296 in the sequence (represented by film strip 294).

ORIENT

Definition: Rotating one or more subregions of the device by rotating the subregions about the center of the device, such that the plane of rotation is one of the device's surface planes, and the amount of the rotation is a multiple of 90 degrees (i.e. to rotate the device between cardinal compass points). Orient can be considered a special case of SPIN, which in turn is a special case of REVOLVE.

Figure 22:
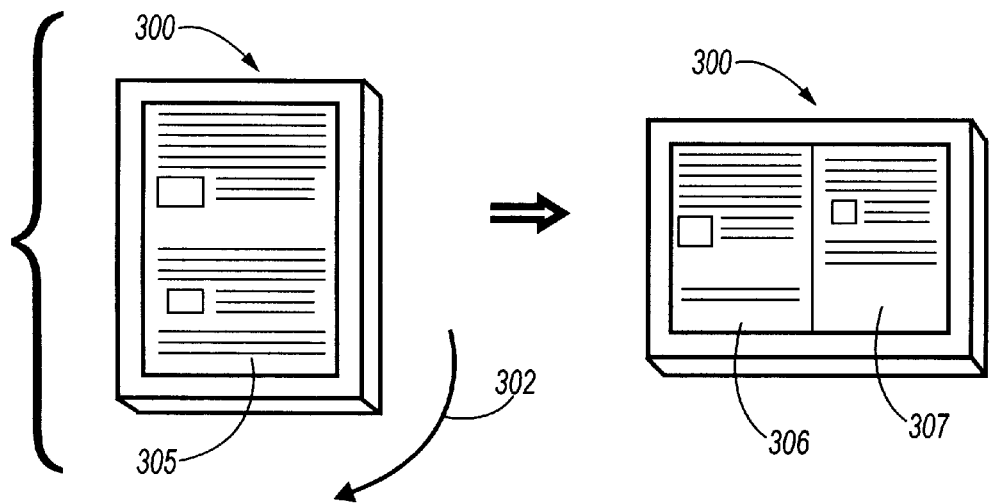

Example: As illustrated in FIG. 22, consider a device 300 which can display a document in either 1 page, 2-page, or 4-page format ("1-up", "2-up", or "4-up"). When the user performs the orient gesture in a clockwise direction (arrow 302), the device 300 increases the number of document pages it is displaying from one page 305 to two pages 306 and 307. Further orient gestures would increase the number of displayed pages. When performed in a counter-clockwise direction, the device 300 decreases the number of pages it is displaying.

FACE

Definition: Manipulating one or more subregions of the device such that a first set of subregions is no longer bottom-most and a second distinct set of subregions now assumes the first subregions former position.

Figure 23:
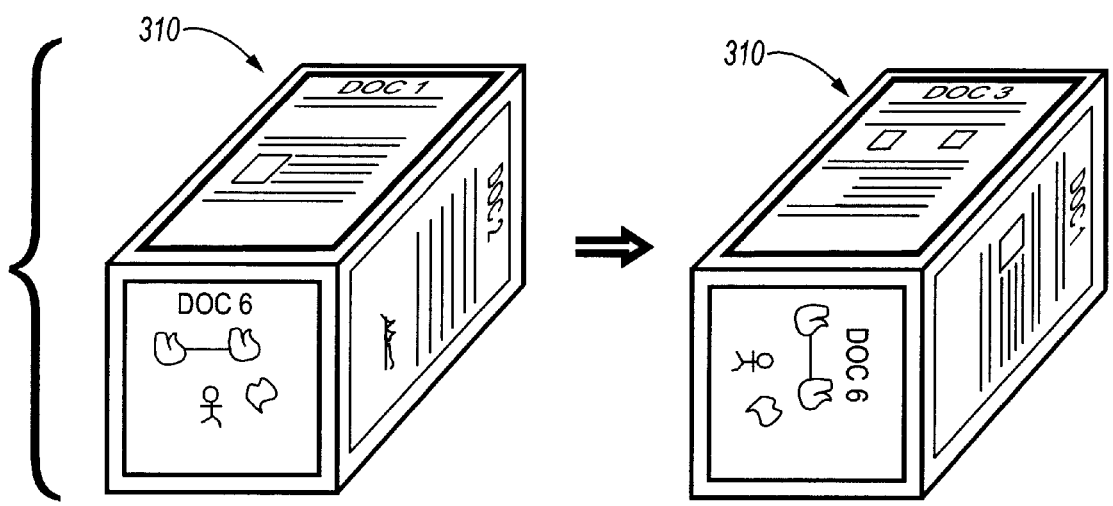

Example: As illustrated in FIG. 23, consider a device 310 which displays documents, and which allows users to edit such documents. Consider further the case in which the device presents itself to the user in the form of a cube, in which 6 different documents are displayed on the 6 different faces. When the user performs the "FACE" gesture by making a particular face top-most, the document which is now on the top-most face becomes editable by the user, while the document which is no longer top-most is no longer editable.

LIFT

Definition: The movement of a device's center of mass in a direction opposite to the current gravitation force acting on the device.

Example: Commanding the device to display the computer's file system at a position one level higher in the hierarchy.

PAN

Definition: The application of a TRANSLATION to a device such that it is moved parallel to the front of the user's body, at a substantially constant height.

Example: Viewing a spread-sheet on a device with a display so small only one cell can be shown. By PANing the device, the contents of the current row can be shown in sequence depending on the rate or amount of PAN. However, if the device were rotated away from its current orientation during the PAN, a new row would be chosen. The selection of the row could be dependent on the deviation from the original orientation.

PUSH-PULL

Definition: Manipulating one or more subregions of the device by spatially translating them such that they are moved along a line of projection from the center of the device to the vertical axis of the user's body.

Example: Consider a device with audio output capability. As the device is "pushed" further away from the body, its audio output level increases. When it's "pulled" towards the body, its level decreases.

WHACK

Definition: The application of an accelerative or de-accelerative force to one or more subregions of a device such that said subregions contact or are contacted by an external object, causing an equal and opposite countering force.

Figure 24:
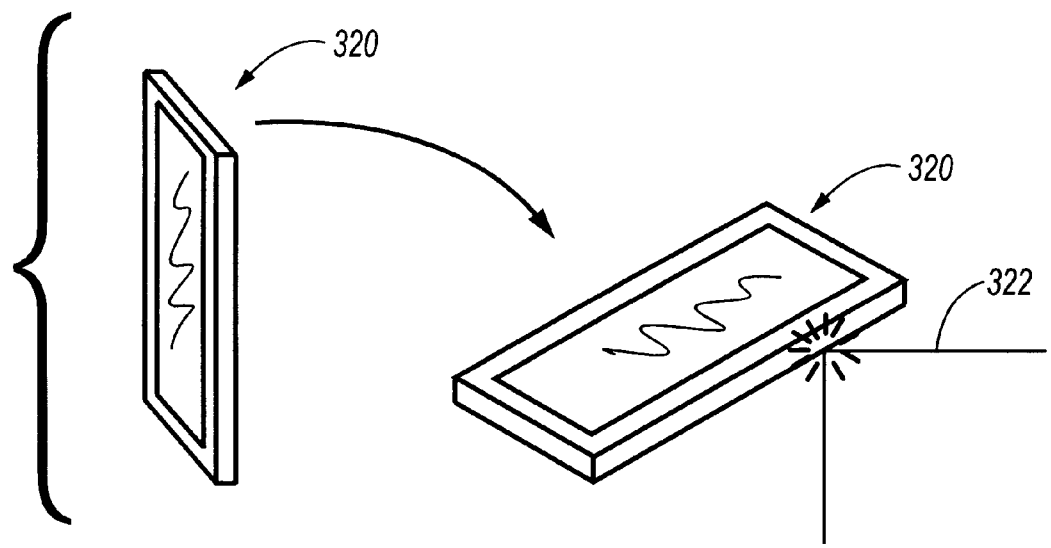

Example: As illustrated in FIG. 24, consider a device 320 which can perform long and unpredictable database searches. When the user performs the WHACK gesture (e.g. upon a table 322), the current search is aborted.

ORIENT (relative to environment)

Definition: Manipulating two subregions of the device such that the line drawn between the centers of those two subregions alters its orientation with respect to the surrounding environment.

Example: Displaying a CAD drawing of a machine-part in 3D on the display of a mobile device. As the orientation of the device changes, so too does the viewing angle and position of the rendered image.

ORBIT

Definition: Rotating one or more subregions by rotating the subregions and/or the center of mass of the device about some point exterior to the physical boundaries of the device, about any arbitrary axis.

Figure 25:
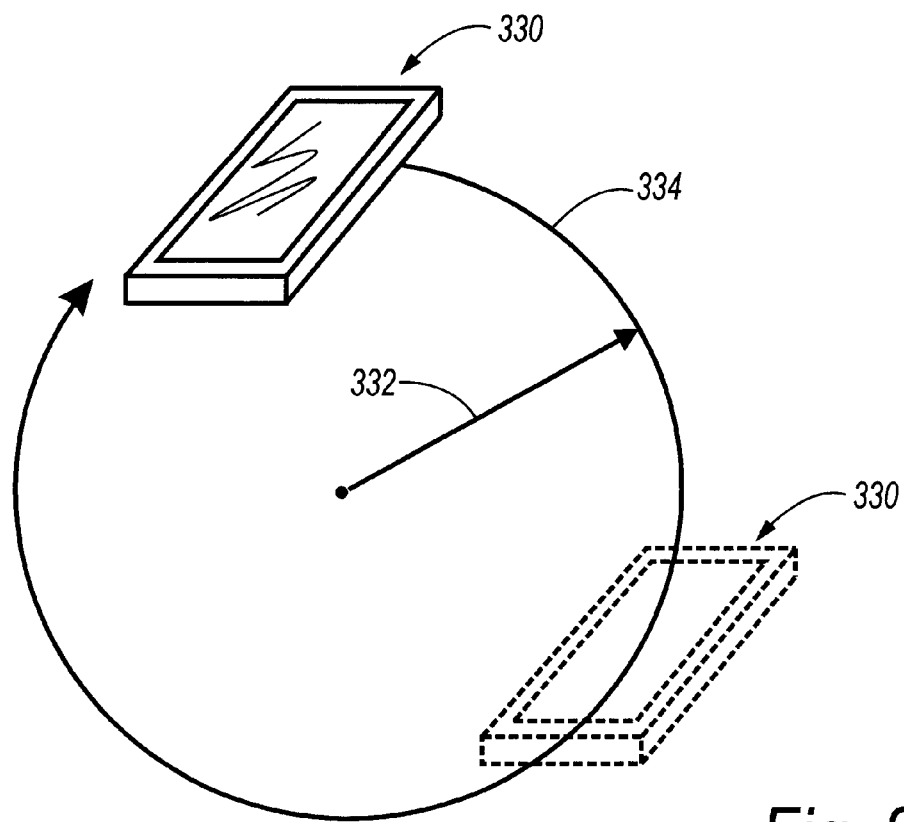

Example: As illustrated in FIG. 25, consider a device 330 which can search a network database, such as the World Wide Web, for information. When the user performs the "orbit" gesture, such a search is initiated. The radius 332 of the rotation 334 specifies the breadth of the search—wider circles specify a wider search. The speed of the gesture specifies the time limit imposed on the search—the quicker the gesture, the more cursory the search.

ORBIT RELATIVE TO USER

Definition: Rotating one or more subregions by rotating the subregions and/or the center of mass of the device about some point exterior to the physical boundaries of the device, where said point is proximal to a body feature of the user. This is a special case of ORBIT.

Figure 26:
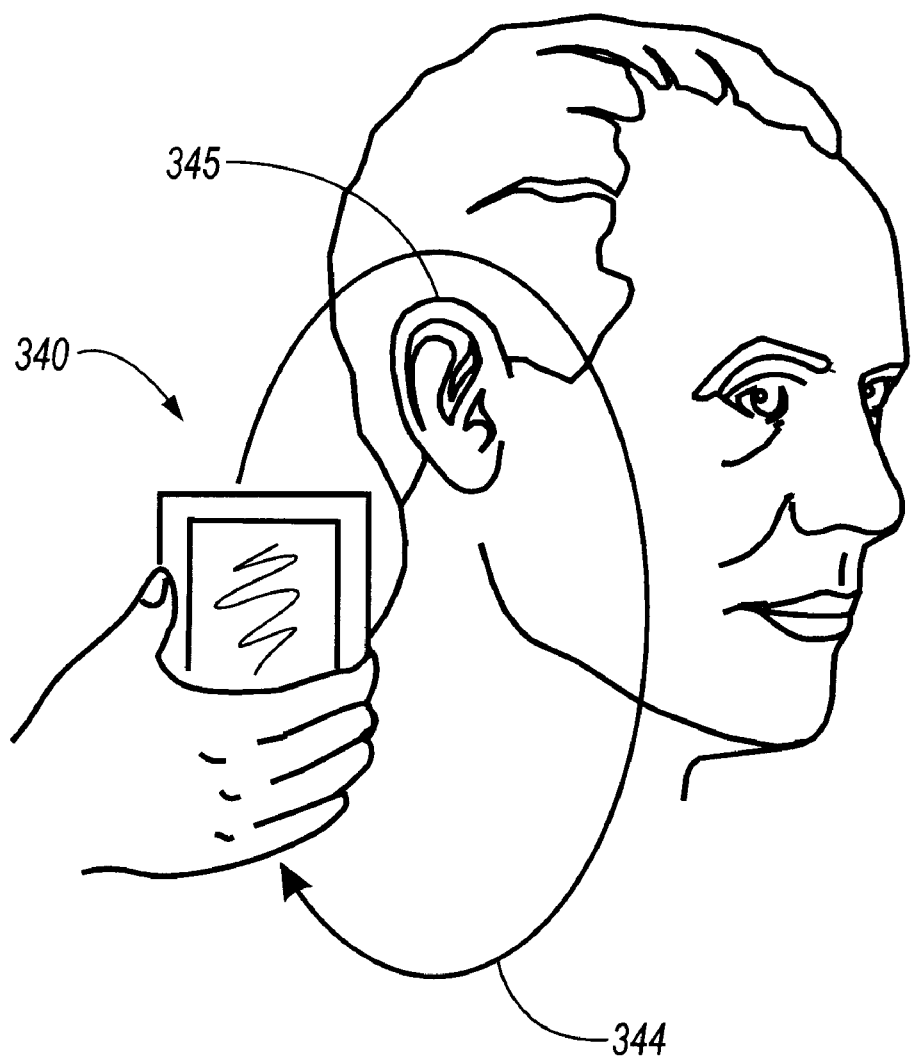

Example: As illustrated in FIG. 26, consider a device 340 which can perform audio output. By performing the ORBIT gesture (in direction indicated by arrow 344) about the user's ear 345, the audio output is activated.

MOVEMENT IN ROOM

Definition: The local detection of a device's 3D position relative to reference points found within an enclosing room. Differences in the measured position are used to trigger actions.

Example: A virtual filing system that allows you to save and restore files based on the devices current position in the room. To save a file you might think carefully about the contents of the file and then walk to the position in the room that might be most easily associated with it. When retrieving the file you would use the same thought processes and go back to the position you had associated with the file. On doing so the files associated with that position would be displayed and you would then be able to select the file you were looking for. The system is useful because the human mind is very good at remembering information that is spatially organized rather than in some abstract information data structure.

MOVEMENT BETWEEN WIDELY SEPARATED SITES

Definition: Manipulating one or subregions of the device such that the detected absolute spatial position of those subregions is changed.

Example: Consider a device which can display information from a database of client information. When the device is moved to a different client site, the device automatically updates its display to display information for the nearest client site.

Figure 27:
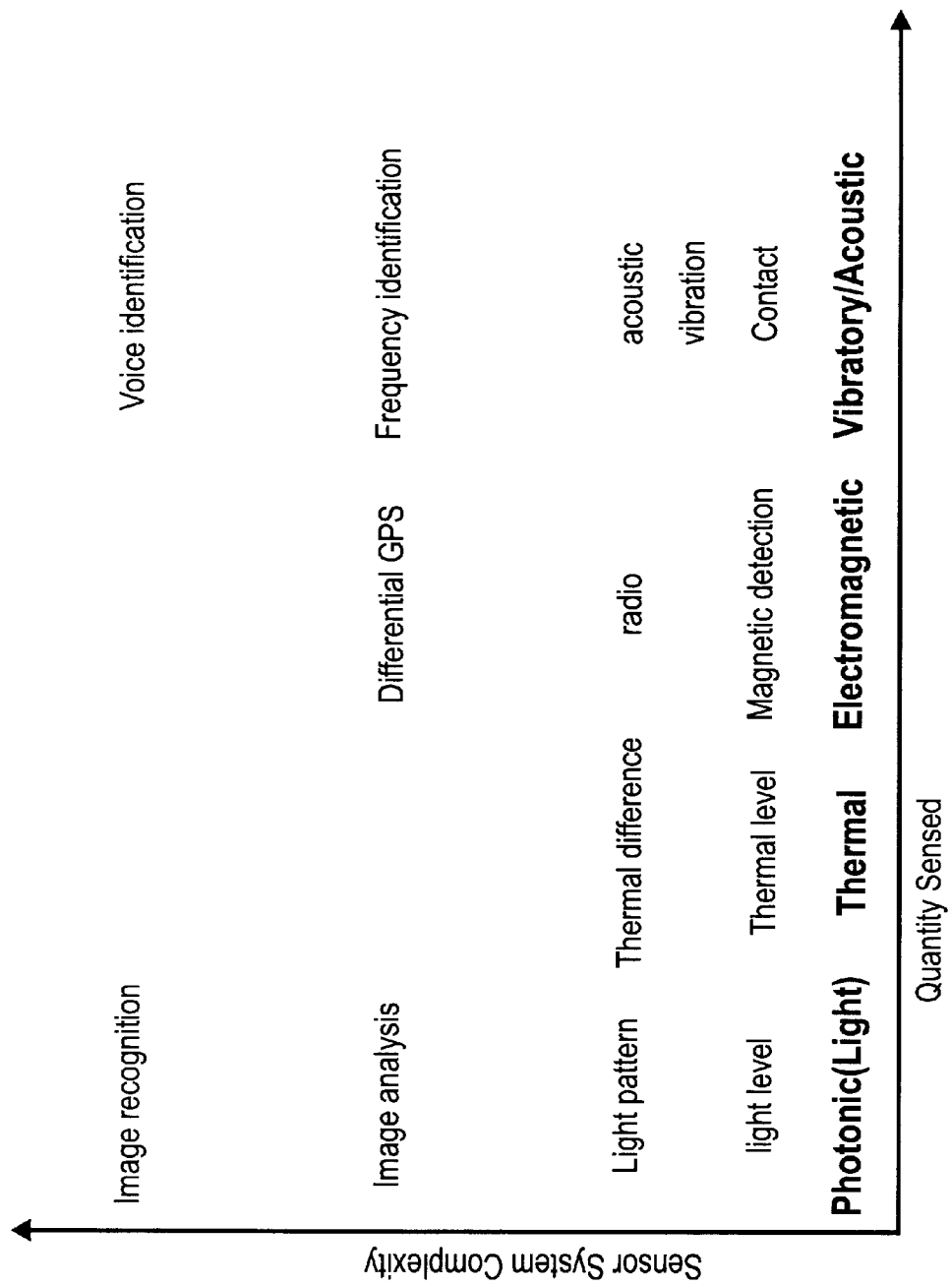
FIG. 27 is a graphical illustration showing increasing degrees of sensor system complexity that can be used to detect various categories of environmental stimuli, including light effects, thermal effects, the electromagnetic environment, and the vibratory/acoustic environment.

In addition to morphemes based on physical manipulation or spatial positioning, various morphemes based on sensed environmental conditions are contemplated to be useful in practice of the present invention. To aid in understanding the diversity of contemplated environmental morphemes, FIG. 27 illustrates selected environmental morphemes loosely arranged in order of increasing sensor complexity needed in some commonly sensed environmental categories. For each of the proffered categories, some selected sensing systems supportable by a device such as that described in conjunction with FIG. 1 are presented:

LIGHT

Definition: Manipulating one or more subregions of the device such that the amount of light falling upon those subregions changes.

Example: Consider a device used in a lecture hall to take notes. When the room lights are turned on, the light sensors detect this and turn down the backlight to conserve energy. When the room lights are turned off (e.g. during a slide show) the light sensors detect this and turn up the backlight to increase viewability.

Light sensors can range from thresholded binary light detectors, to light pattern detectors, to full imaging systems. Advanced techniques can include image analysis and recognition to identify objects or persons.

HEAT

Definition: Manipulating one or more subregions of the device such that the amount of heat applied to those subregions changes.

Example: Consider a portable computer which has a stylus for entering text. By looking at the heat profile along the back surface of the computer, the computer can detect whether it is being held with the left hand, the right hand, both hands, or neither hand, and update its interface accordingly.

Thermal (heat) sensors can range from simple temperature sensors to sophisticated differential thermal mappers and thermal imagers.

ELECTROMAGNETIC

Definition: Manipulating one or more subregions of the device such that the electromagnetic spectrum applied to those subregions changes.

Example: By analyzing the radio spectrum, the device can derive estimates as to its absolute spatial position, and use that to alter its functionality.

Electromagnetic detection can include magnetic compasses, radio detection, or GPS signal detection. More advanced techniques can include electromagnetic spectrum analysis and interpretation, such as roughly determining location based on available radio signals.

VIBRATE

Definition: Manipulating one or more subregions of the device by vibration.

Example: Consider a device which displays textual information. When the user takes the device on the bus, the ambient vibration level sensed by the device changes, and the device increases the size of the displayed text to help the user compensate.

This class of environmental morphemes can include detection of intermittent contacts, low frequency rumblings, or acoustic level detection. More advanced techniques requiring greater processor power include maximum frequency identification, spectral analysis of acoustic frequencies (enabling the device to distinguish background environmental noises from speech, for example), or even speech based identification of persons in the vicinity of a device.

Figure 28:
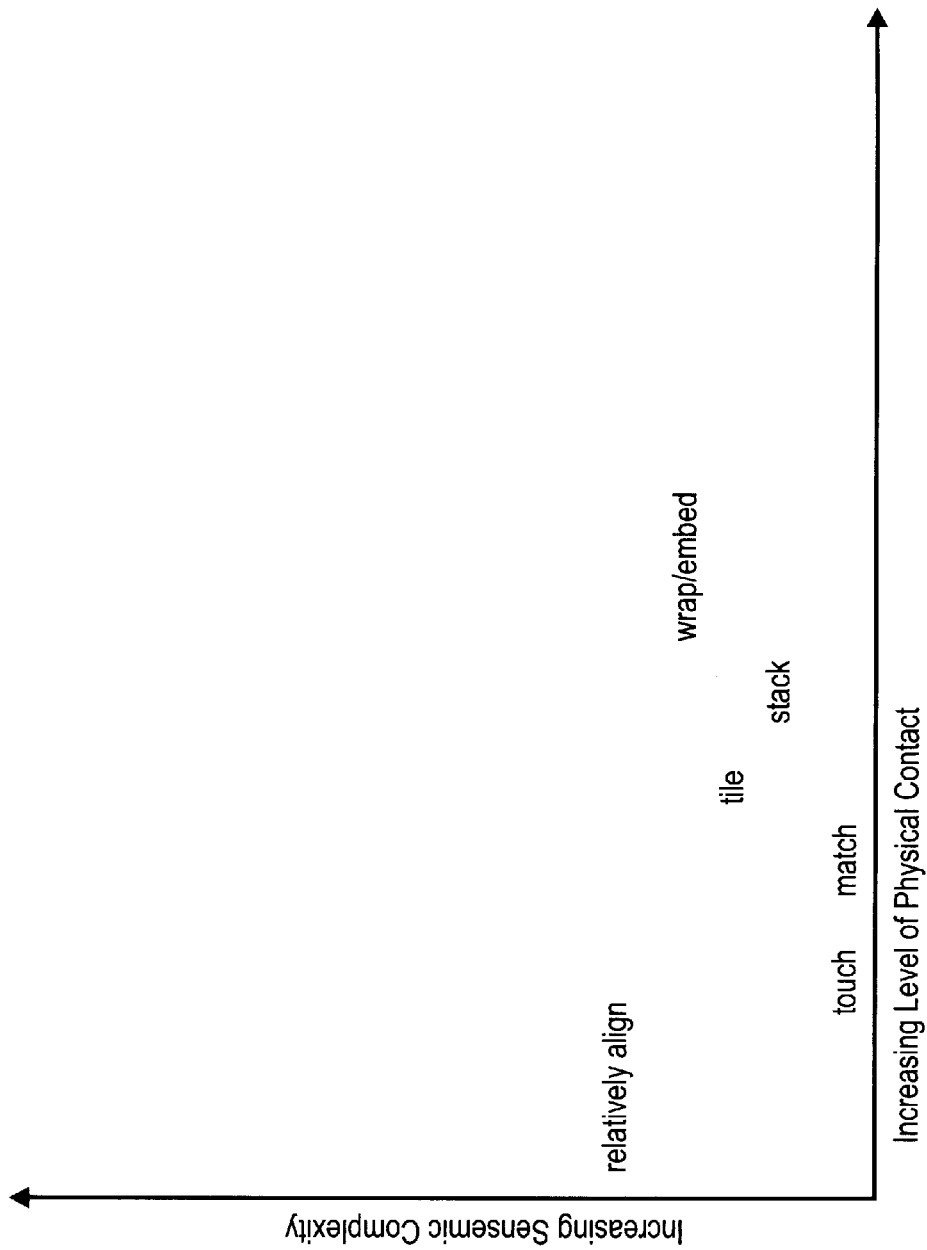
FIG. 28 is a graphical diagram illustrating various physical manipulation morphemes for multiple interacting devices, with axes respectively illustrating the complexity of senseme tuples required to form a morpheme, and increasing level of physical contact.
Figure 29:
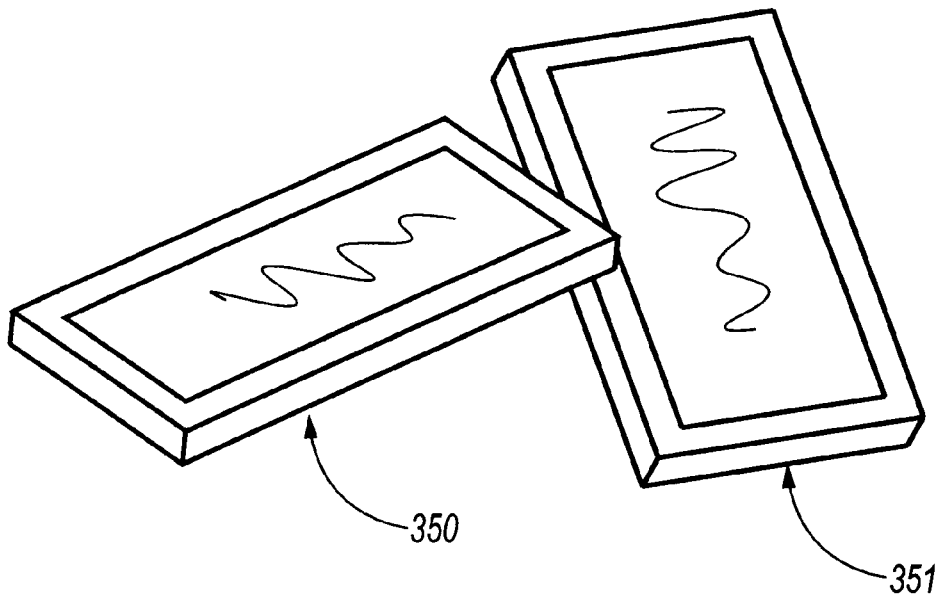
FIGS. 29–34 schematically illustrate various preferred manipulation morphemes for multiple interacting devices.

In addition to morphemes based on physical manipulation, spatial position, or sensed environmental factors, various morphemes based on cooperation between multiple interacting devices are contemplated to be useful in practice of the present invention. To aid in understanding the diversity of contemplated spatial morphemes, FIG. 28 illustrates multidevice morphemes arranged by an increasing level of possible physical contact, and by increasing complexity of available senseme tuples required to form or interpret a morpheme applied to a particular class of device. Beginning with a device having only rudimentary edge deformation functionality for supporting simple spatial sensemes, and ending with complex deformable or embeddable devices that can be wrapped about each other, a definition of a possible multidevice manipulation and typical function invoked by that multidevice manipulation of devices similar (but of course possibly more complex) to that described in conjunction with FIG. 1 is presented:

TOUCH

Definition: To move one or more subregions of a device such that they enter physical contact with a subregion of a second device, in any alignment and to any extent. Or, to take two devices so aligned and remove that alignment.

Example: Consider two portable computers 350 and 351, the first of which contains a database, and the second of which contains an IRDA port. When the user touches the first computer 350 to the second computer 351, the database is transmitted via the second computer's port.

MATCH

Definition: To move one or more subregions of a device such that they enter physical contact with one or more subregions of a second device, with the subregion(s) of the first device and the subregion(s) of the second device being aligned along one or more edges. Or, to take two devices so aligned and remove that alignment.

Figure 30:
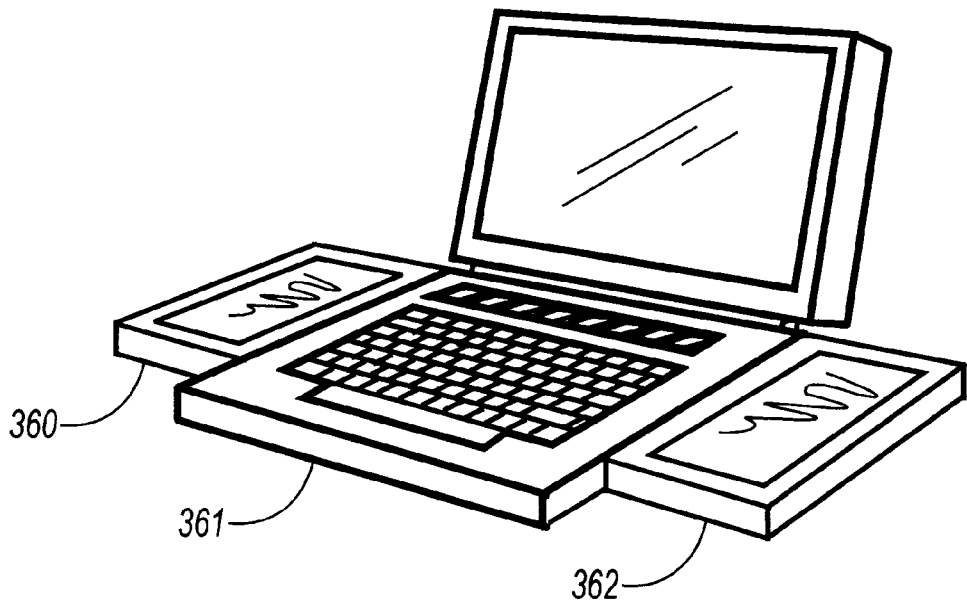

Example: As illustrated in FIG. 30, consider, multiple devices 360, 361, and 362, which contain different versions of the same basic database. When the user MATCHes the first device 360 to the second device 361, followed by matching the third device 362 to the matched first and second devices, their databases are reconciled (synchronized).

STACK

Definition: To move one or more subregions of a device such that they enter physical contact with a subregion of a second device, such that the first device is now located above, but physically adjacent to, the second device. Or, to take two devices so aligned and remove (i.e. unstack) that alignment.

Figure 31:
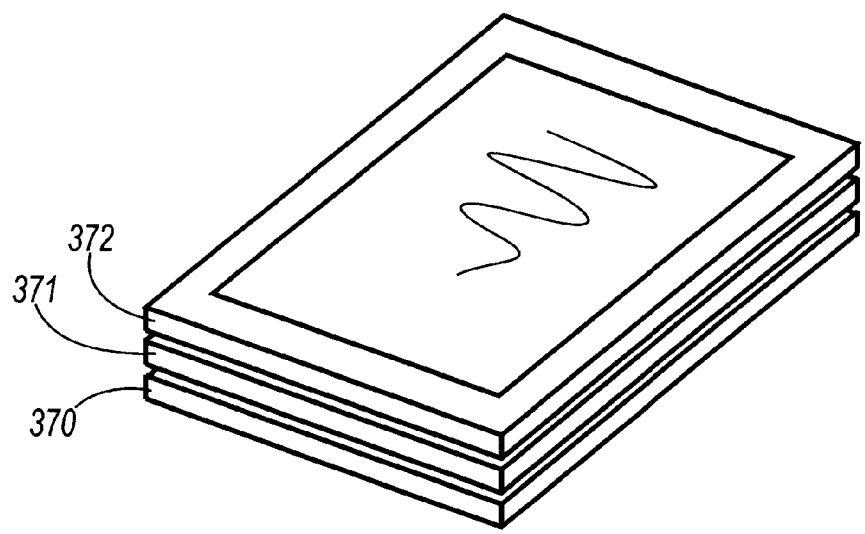

Example: As illustrated in FIG. 31, consider a set of devices 370, 371, and 372, each of which is displaying a frame of video from a longer video sequence. When the devices are stacked, the ordering of the stacking specifies an order for the video editing, and a single composite video is now produced.

TILE

Definition: To move one or more subregions of a device such that they physically contact with a subregion of a second device, such that the first device and second device now form a single seamless spatial unit or to take two devices so aligned and remove that alignment. TILE is a special case of MATCH.

Figure 32:
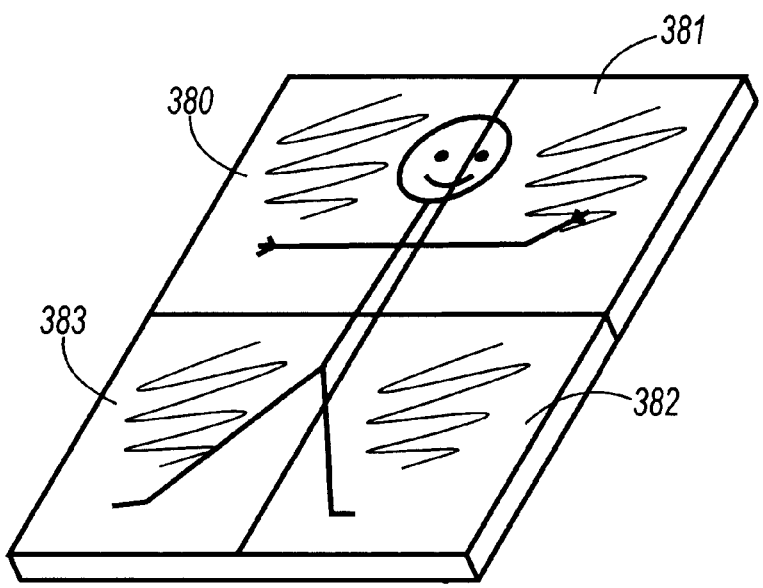

Example: As illustrated in FIG. 32, consider a set of devices 380, 381, 382, 383, each of which can independently display a portion of a large photograph. When the devices are tiled, each device displays the portion of the photograph appropriate to its current relative position in the tiled grid.

RELATIVELY ALIGN

Definition: To move one or more subregions of a device such that they engage in a particular spatial relation to one or more other devices, where said devices are not touching.

Figure 33:
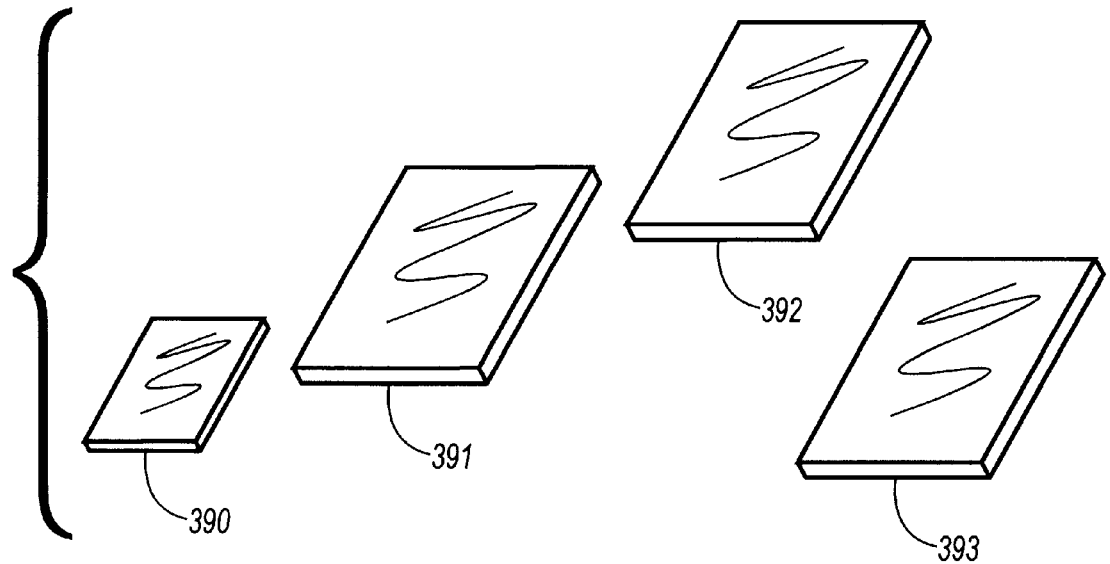

Example: As illustrated in FIG. 33, consider a set of devices 390, 391, 392, and 393 which are displaying a multi-page document. Whichever device is presently placed at the far left (device 390) displays the table of contents, whichever one is presently placed at the far right (device 393) displays the index, and the others display pages according to their respective locations. As different devices can have different display capabilities, moving them about can alter the document display. For example, if only one of the devices has a color display, when it is moved from second position to third position then (a) the device which was in third position, displaying page #2, now displays page #1, and (b) the color display, which was displaying page #1, now displays page #2 in color.

WRAPPING/EMBEDDING

Definition: Manipulating one or more subregions of a device such that these subregions spatially occlude or are spatially occluded by some portion of the second device.

Figure 34:
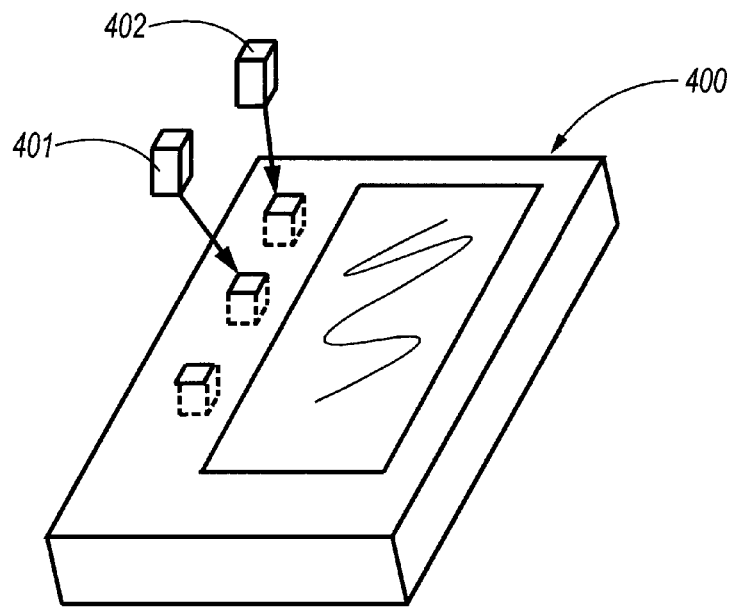

Example: As illustrated in FIG. 34, consider a first device 400 which contains the infrastructure to support the filtering of email. Consider a second set of devices 401 and 402 which implement particular email filters. When the user physically embeds device 401 (or 402) into the first device 400, by which the first device 400 now wraps the second device 401 (or 402), the particular email filter supported by the second device is activated.

As those skilled in the art will appreciate, combinations of any of the foregoing described morphemes based on physical manipulation, spatial position, environmental conditions, or multiple interacting devices can be extended by participation in a morphemic "sentence". A sentence is defined as a sequence of one or more temporally disjoint morphemes. Typically, between about 1/10th of a second and 2-3 seconds suffices to distinguish morphemes within a sentence. Of course, in some circumstances and indefinite time period may elapse. The sentence level allows definition of a physical manipulatory grammar by appropriate choice of a morpheme sequence, and corollary rules governing, for example, use of active (verb like) morphemes, naming (noun) morphemes, or connectors. Just as the position and relation of words in a sentence define the sentence's meaning (e.g. "horse chestnut" is not the same as "chestnut horse"), similarly the position and relation of morphemes in a manipulatory sentence define the sentence's meaning. For example, in a communication mode a FLICK followed by a WHACK could mean "transfer data and erase the local copy", while a WHACK followed by a FLICK means "power on the device and transfer data". In other settings, a FLICK or a WHACK could mean something entirely different. To better understand construction of morphemic sentences, the following examples are discussed:

DATA TRANSFER SENTENCE

Consider a device which can transmit some or all of its information to another device. Furthermore, this transmission can be done either unencrypted, or encrypted (to increase security). Furthermore, this transmission of a text+ graphics document can either include the graphics, or omit them (to save time). Suppose that the user wishes to perform the command "Transmit the information in document A, encrypted, omitting graphics, to machine B". Then a gestural sequence (morphemic sentence) to support this could be:

DEPRESS—the user presses on a displayed representation of A, indicating that A is to be selected for an upcoming operation FLICK—the user flicks the device in the direction of device B, indicating that the operation is a transmission to B FOLD—the user folds the top quarter of the device over the lower three-quarters, indicating that the transmission is to be encrypted.

TWIST—the user twists the device about its central axis, indicating that the data is to be "wrung out", i.e. the graphics are to be omitted SQUEEZE—the user squeezes the device, indicating that they are confirming that the operation is to proceed.

Note that none of these gestures, in isolation, performs an act—the "ensemble" of temporally separated morphemes must be interpreted in order to form the complete action.

DRAWING MODIFICATION SENTENCE

Consider a device which displays geometric shapes for user manipulation. Furthermore, one of the manipulations supported is to resize (or rescale) a shape. Furthermore, suppose that this resizing can be done either aliased Baggy) or anti-aliased (edges are smoothed). Suppose that the user wishes to perform the command "Resize shape A by 120%, about the X axis only, using anti-aliasing". Then a morphemic sentence to support this could be:

DEPRESS—the user presses on a displayed representation of A, indicating that A is to be selected for an upcoming operation STRETCH—the user stretches some portion of the device, indicating that the operation is to be a resize. When the user starts stretching, a portion of the status display displays "100". The user continues to stretch until the status display reads "120"

RELIEF-MAP—the user "scores" the display by making a horizontal line of depression, indicating that the operation is to take place only about the horizontal (X) axis.

DEPRESS—a circular thumb stroke is made in a different area of the device, indicating that anti-aliasing (smoothing the edges) is to be performed.

DATABASE PRESENTATION SENTENCE

Consider a device which contains various personal information databases, such as a list of phone numbers, a list of addresses, and a calendar. Suppose that the user wishes the most appropriate of those databases displayed. Then a gestural sequence to support this could be:

SPATIAL LOCATION—the user carries the device such that it is spatially proximate to either the telephone, the address book, or the refrigerator (where the family calendar is displayed), whichever is appropriate.

DEPRESS—the user touches the device to activate the operation. The device now displays the personal information appropriate to that location.

DATABASE RETRIEVAL SENTENCE

To extend the foregoing example of a database presentation sentence, consider two computers which contain calendar databases. If the user wishes to synchronize the calendars, a suitable gestural sequence to support this could be:

SQUEEZE—the user squeezes the device to activates its gestural recognition capabilities ORBIT—the user orbits the device about the surface of the other device 3 times, indicating a desire to only match data for the next 3 weeks.

MATCH—the user matches the edge of the device to the edge of the calendar, indicating a desire to "match" contents between the two devices.

PRINTER/COPIER CONTROL SENTENCE

Consider a device which can produce paper copies of documents. Suppose that the user wishes to tell such a device to produce a stapled, two sided copy of document A, enlarged to the next greater size. Then a gestural sequence to support this could be:

DEPRESS—the user presses on a displayed representation of A, indicating that A is to be selected for an upcoming operation RIP—the user introduces a spatial discontinuity into a portion of the device, indicating that the upcoming operation is to be a copy ("carrying away" some of the data).

PINCH—the user pinches the upper left corner of the device, indicating that the copies are to be stapled.

SQUEEZE—the user presses on the front and back of the device, indicating that the copy is to be two-sided.

STRETCH—the user stretches the device, indicating that the copy is to be an enlargement to the next greater size.

FACE—the device typically has its paper emitter on the bottom, preventing users from making copies accidentally. By facing the device such that the emitter is on the side, the copying operation is initiated.

LIGHT BASED CONTROL SENTENCE

Consider a device which can display documents. Suppose the user is using the document while seated on a train, and wishes the document to display itself with a backlight when the train enters a tunnel, and wishes the document to display itself in a larger font when the train rumbles over rough tracks. Then a gestural sequence to support this could be SQUEEZE—the user squeezes on the device, indicating that a loss of light is to be compensated for by a backlight.

LIGHT—as the train enters a tunnel, the LIGHT gesture is made, and the device turns on the backlight.

WHACK—the user briskly raps the device against the palm of their hand, indicating that their desired preference for adjusting hard-to-read documents is to increase the font size.

VIBRATE—as the train goes over a bridge, the vibratory gesture is sensed. Because of the position of this VIBRATE morpheme (after the preceding WHACK gesture) in this morphemic sentence, the device now increases the font size on the displayed text.

LIGHT—the user puts the device into his suitcase, making the LIGHT gesture. In this context (with no SQUEEZE before it), the LIGHT gesture causes the device to power-off its display.

To better appreciate utility and construction of devices in accordance with the present invention, several examples of devices are now described:

PORTABLE COMPUTER WITH SQUEEZE AND TILT CONTROL

Figure 35:
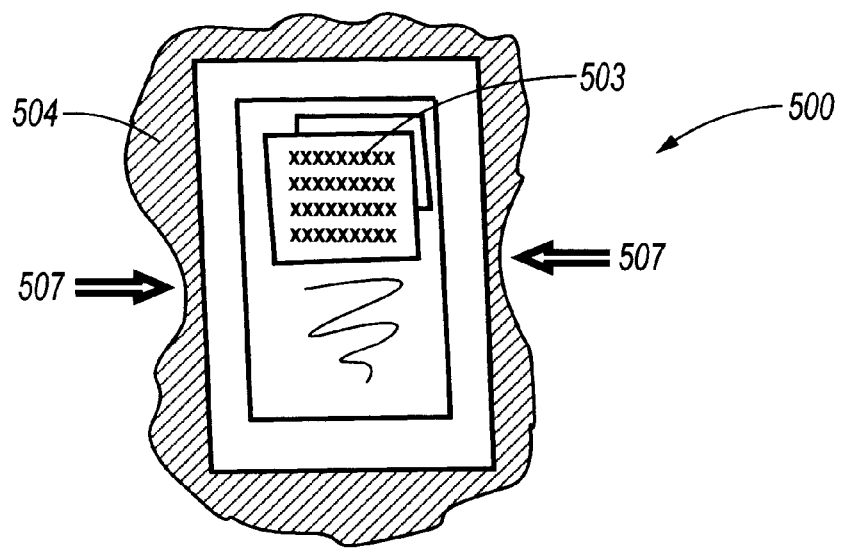
FIGS. 35 and 36 are schematic diagrams illustrating "squeeze" and "tilt" morphemes applicable to a portable computer.
Figure 36:
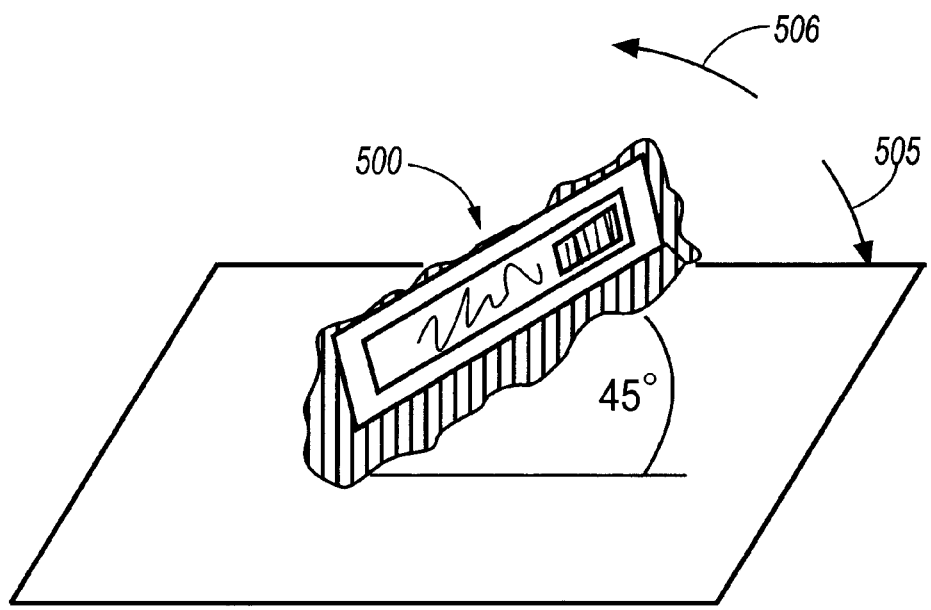

A handheld portable computer 500 (e.g. a 3Com® PalmPilot®) capable of being fitted with deformable, pressure sensitive edging 504 is schematically illustrated in FIGS. 35 and 36. The computer 500 supports a name and address software application, providing a user viewable name-address entry field on display 503. In this embodiment, a user can squeeze the deformable, pressure sensitive edging 504 (squeeze arrows 507) of the computer 500. In response, the name and address software application causes the display 503 to animate by slowly incrementing (scrolling) through the name list from "A" towards "Z" entries. When the user squeezes edging 504 again, the software application stops the scrolling animation. Scrolling functionality is further enhanced by the use of a tilt sensor, which allows the computer's behavior to mimic conventional rotatable address books. If the computer 500 is tilted away from the 45 degree angle at which someone might typically hold it, the scrolling rate is increased. In this application, the closer the computer 500 was tilted towards the user (as indicated by arrow 506 of FIG. 36), the faster the scroll rate toward "Z". However, if a user tilted the computer 500 back past the neutral 45 degree position (as indicated by arrow 506 in FIG. 36), the animation would move backwards with a velocity related to the magnitude of tilt. In this way it was possible for a user to search for items in a long list in a very natural way, while only using one hand.

Figure 37:
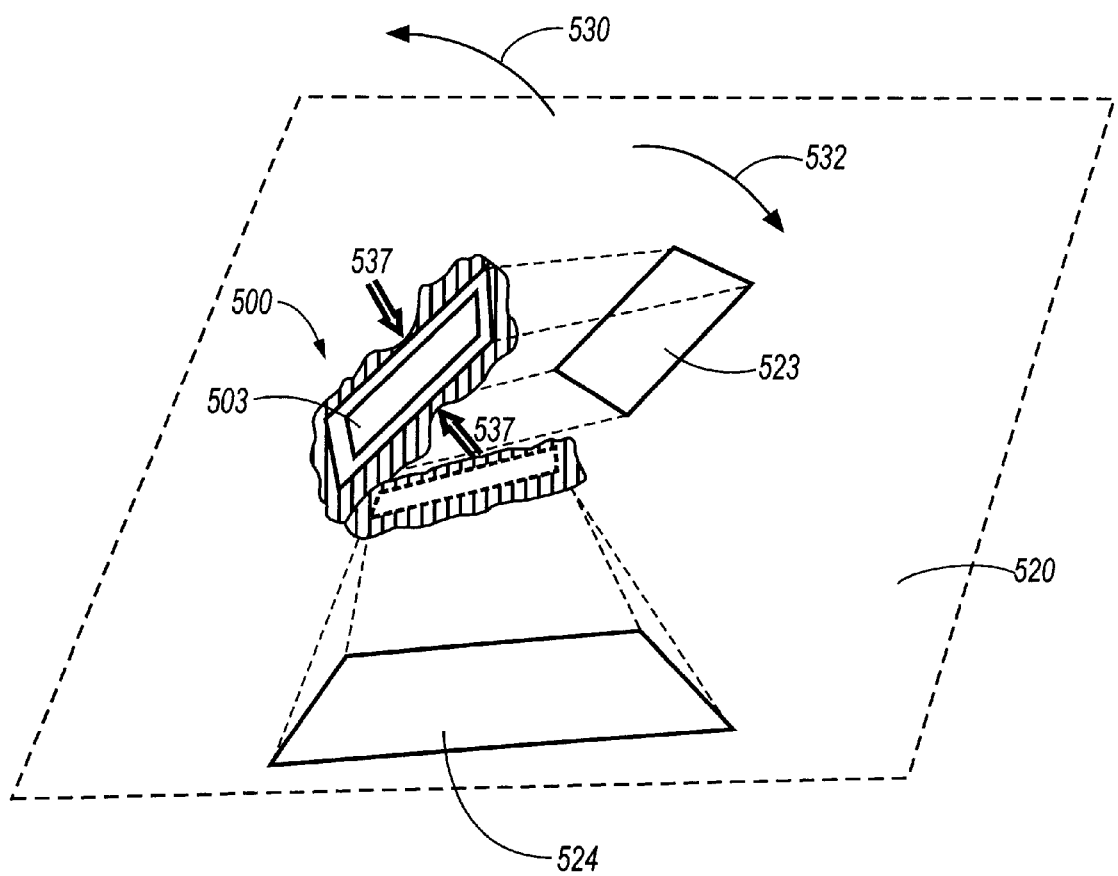
FIG. 37 is a schematic diagram illustrating tilt and squeeze morphemes used to control view of large two dimensional data sets with a relatively small display of a portable computer.

In an alternative mode schematically illustrated in FIG. 37, scrolling speed can be completely controlled by pressure. The greater the squeeze pressure (arrows 537), the faster the list scrolls. Release of the applied pressure causes the scrolling to halt. In this alternative user interface strategy, application tilt (as indicated by orthogonal tilt arrows 530 and 532) could be used to change the direction of the scrolling through the list, allowing a user to search portions of a large two dimensional data set (schematically illustrated as a data plane 520) that is not entirely visible either horizontally or vertically on display 503. By simply tilting the display 503 of computer 500 as if it were a window through which the data plane 520 can be viewed, any particular portion of the data plane (for example, data subset 524) can be viewed. As will appreciated, in both the foregoing modes the speed of scrolling, the specific neutral tilt angle, and required pressures to initiate scrolling changes can be adjusted to fit a particular user.

PORTABLE COMPUTER WITH HANDEDNESS DETECTION

Figure 38:
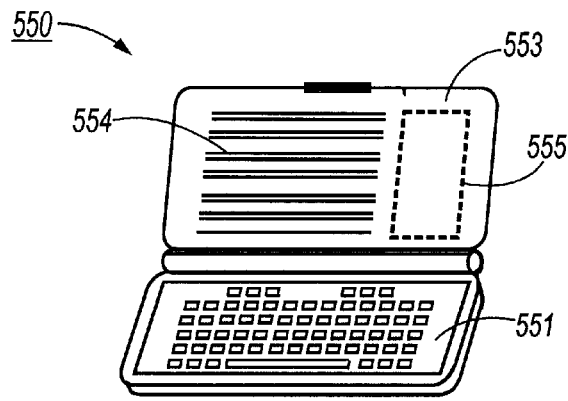
FIG. 38 is a schematic illustration representing a portable computer having a display ready to receive annotations from a right handed user.
Figure 39:
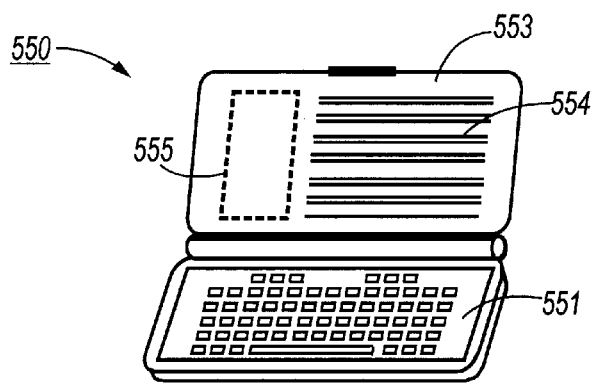
FIG. 39 is a schematic illustration representing a portable computer having a display ready to receive annotations from a left handed user.

Pressure sensors have been added to augment a conventional keyboard 551 enabled user interface to a hand holdable Windows® CE class computer 550 (i.e. a Cassio® Cassiopia®) schematically illustrated in FIGS. 38 and 39. In this embodiment, user handedness was determined by using pressure sensors positioned on a right back-edge and a left back-edge of computer 550. User studies have found that the difference in pressure between the right and left side gave a direct indication of handedness of a user. As respectively illustrated in FIGS. 38 and 39, handedness was used to justify formatted text 554 to the left (FIG. 38) or right (FIG. 39), thereby allowing more space 555 on display 553 for an electronic annotation pen to be used to mark-up the text.

For both the embodiment of the invention illustrated by FIGS. 35–37, and the foregoing embodiment illustrated in FIGS. 38 and 39, material deformation of a spongy, elastic, or otherwise deformable material must be measured. Although various techniques can be used to measure material deformation, including those based on imaging or fluid volumetric changes, one particularly useful technique is based on the use of pressure transducers. Commercially available sensors measure pressure (indicative of material deformation) by converting a pressure change to a change in electrical characteristics. For example, inexpensive sensors that change resistance in response to pressure can be obtained in a variety of shapes and sizes, including paper thin sensors, and easily bendable sensor strips. Sensors of this kind can be customized to any particular shape or form that a gestural Ul might require. The change in resistance is usually linearly related to pressure, with the sensor generally being placed in a potential divider network to model the pressure as a change in potential. For a practical circuit the resulting signal needs to be amplified, buffered and translated such that the change in value from minimum pressure to maximum pressure spans a useful range. The modified signal can now be fed into an analog to digital converter (ADC) to produce a digital representation of pressure. An 8-bit ADC can typically be used for most applications, however, if greater sensitivity to pressure changes is required, a higher resolution ADC (e.g 16-bit ADC) can be used. As will be appreciated, the ADC could be memory mapped into the processor's address space as a peripheral, or alternatively supplied as a retrofitted pressure interface to existing computers capable of benefiting from this system. Since an RS232 connection is an interface that is almost universally available on portable computers, one strategy is to have the parallel output of the ADC converted into a serial RS232 frame using a serializer such as a UART and then level-shift and buffer the signal as specified by the RS232 standard. At the computer end of the serial interface, another level-shifter and UART, the output of which is readable by the processor, performs the serial-to-parallel conversion.

Figure 40:
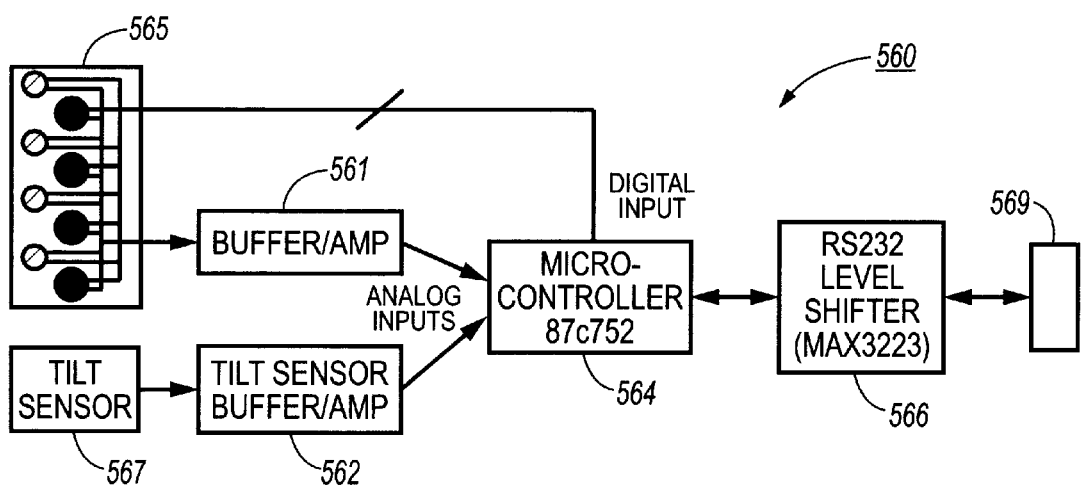
FIG. 40 is an electronic schematic illustrating components of the pressure and tilt sensitive modules of a portable computer such as illustrated in FIGS. 35–39.

As described with reference to FIG. 40, in realizing a working system a microcontroller 564 (a Signetics 87c752) with an ADC built in to combine many of the I/O tasks in a single chip can be used in combination with level shifter 566 (a MAX3223). This approach has the advantage that intelligent processing of the input signal is possible with software. Tilt measurement was provided by a tilt sensor 567 connected to a buffer/amp 562 to supply an analog signal to microcontroller 564. The pressure measurement can also be encoded within a protocol across the serial link. This particular microcontroller 564 has five ADC inputs, but by making use of eight digital control lines, it is possible to use only one ADC input and one buffer amplifier 561, to measure up to eight pressure points with pressure sensors 565. This is achieved by using the control lines to select only one sensor at a time and take a reading for each using a single input to the ADC. After eight sensors have been selected, eight readings are acquired in memory. The design is practical because the microcontroller can take measurements and make analog to digital conversions at a rate far higher than is needed to communicate with a host computer 569.

For scrolling or handedness based software applications, 16 levels were determined to be adequate for representing a pressure measurement. In order to have a high data throughput to the host computer 569, each measurement was encoded in one byte of an RS232 frame such that the four lowest bits were the pressure representation and the highest four bits were the sensor ID. Each frame of the RS232 data was therefore completely self contained. Of course any protocol that limits itself to a specific number of devices in its address space will eventually have the problem that someday applications might be designed that need to reference far more devices than are supported. The solution used in this protocol is to reserve the sensor ID number 15 as a special value that can extend the semantics of the encoding to include an arbitrary number of bytes representing a sensor or value. For the described software applications, the commonly used RS232 frame format (1 start, 8 data no parity, 1 stop bit at a baud rate of 9600) was chosen.

In operation, the host computer 569 determined handedness by utilizing information about the current pressure exerted on two subregions—one, on the back of the device, occupying roughly the left half, and the other, also on the back of the device, occupying the right half. The current pressure values were converted from analog to digital form, such that a digital value of 0 (zero) represents no pressure, and a digital value of, for example, 15 represents maximum pressure. The detection circuitry then proceeds:

if (left_sensor is high AND right_sensor is high) then
        conclude that the user is gripping the device with both hands
    else if (left_sensor is high AND right_sensor is low) then
        conclude that the user is gripping the device with the left hand only
    else if (left_sensor is low AND right_sensor is high) then
        conclude the user is gripping the device with the right hand only
    else if (left_sensor is low AND right_sensor is low) then
        conclude that the user is gripping the device with neither hand Also, to optimize communication, pressure values are only sent when they change. In order to account for jitter and error in the pressure sensors, a sensor is only considered 'high' if its value is higher than some minimum threshold (e.g. '2' on the 0 to 15 range).

SCANNER/PRINTER/COPIER SUPPORTING EDGE DEFORMABLE DISPLAY

Figure 41:
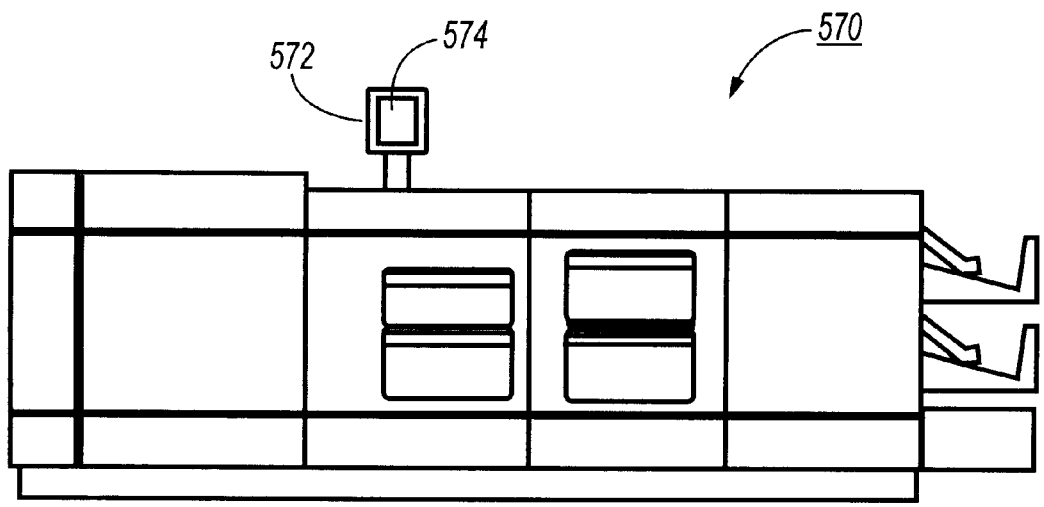
FIGS. 41 and 42 are schematic illustrations of a scanner/printer/copier using a paper shaped display interface to support morphemic input.
Figure 42:
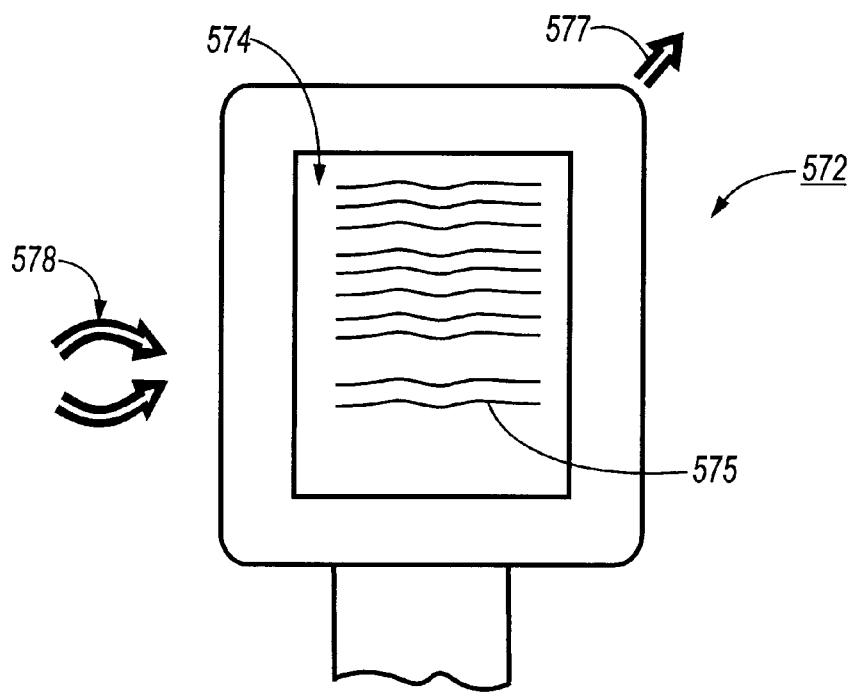

A scanner/printer/copier device 570 is schematically illustrated in FIG. 41. As seen in FIG. 41 (and in more detail in FIG. 42) the device 570 supports a display 574 having a deformable edge 572, with the combination roughly shaped like a piece of paper. In operation, a user can place a written document in the device 570 for scanning. An electronic version of the scanned document is displayed (i.e. as text 575 in FIG. 42) on the display 574. By outwardly pulling the deformable edge 572 as indicated by arrow 577, a user can instruct the device 570 to resize the document before printing or copying. Pinching opposing sides of the deformable edge 572 (arrows 578) can further instruct the device 570 to print double sided copies. As will be appreciated, various other morphemes can be used to provide a simple interface for interacting with device 570.

TANGIBLE DEVICE FOR COMPUTER LOGON

A password protected personal computer 612 is a component of a computer system 610 that includes connection to a computer network 614. The tangible computing device takes the form of a stylized key 620, in accordance with a common metaphoric or analogical connection between access restricted physical security and a key. Like a conventional key used to open a door, the stylized key 620 can "open" computer system 610 by initiating logon procedures and providing passwords to a computer 612.

Figure 43:
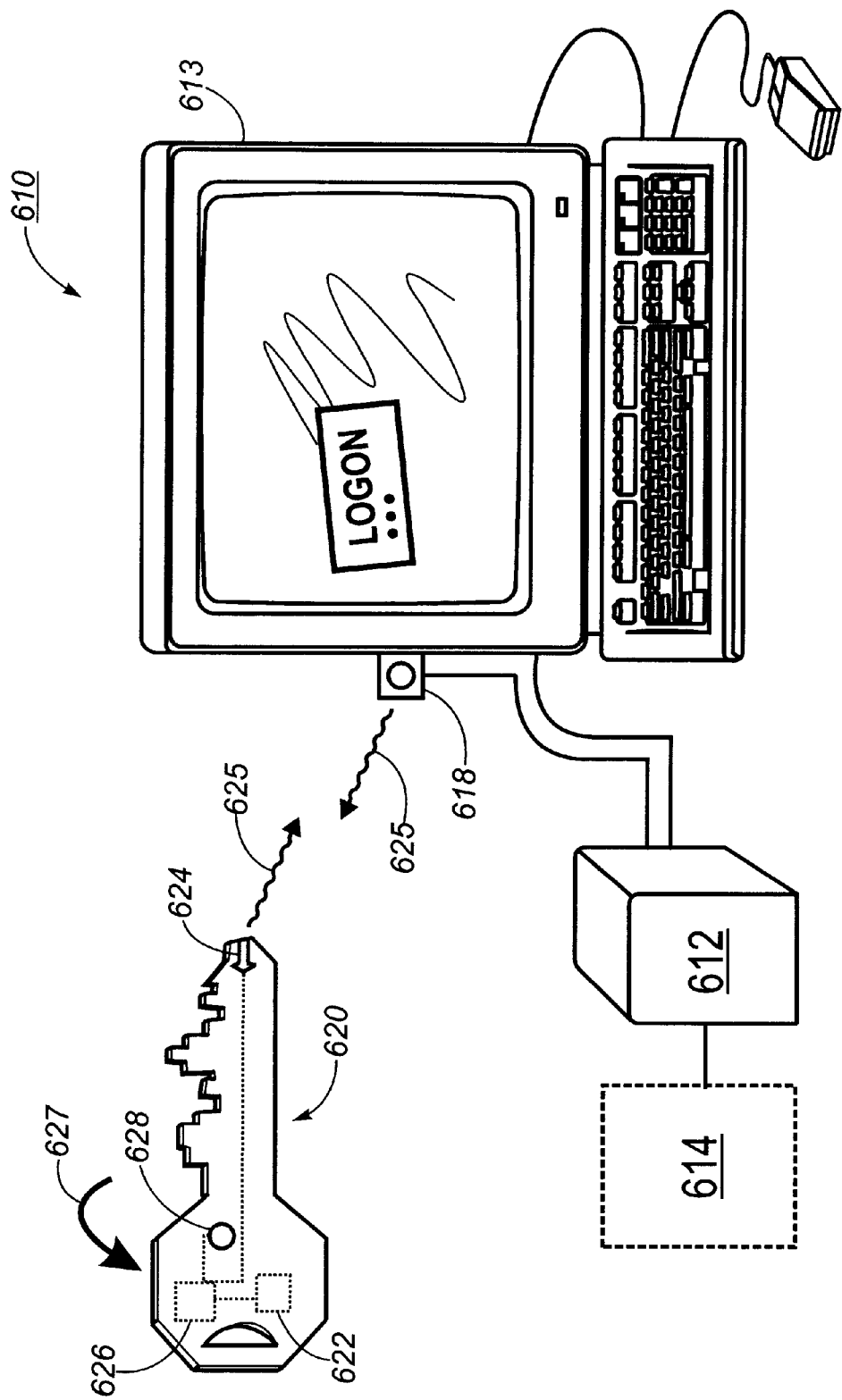
FIG. 43 is a schematic view of a tangible computer interface formed as a stylized key, with rotation of the key enabling logon to a password protected personal computer.

Typically, a wireless acoustic, radio or infrared system is used to permit intercommunication between the key 620 and the computer 612. In FIG. 43, a conventional infrared transceiver 618 connected to computer 612 is used to receive and transmit infrared signals 625 to an infrared transceiver 624 supported by key 620. The infrared transceiver 624 is connected to a processor/memory unit 626 positioned within key 620. The key 620 also includes processor/memory unit 626 connected sensor 622 and feedback unit 628. The sensor 622 can be constructed to detect tilt and rotation using conductive metal liquid switches, accelerometers, gravity or acceleration detecting microelectromechanical mechanisms, or any other convenient mechanism for detected transient tilts or rotations of the key 620. The sensor 622 can also support pressure sensing mechanisms, squeeze or stretching sensors, thermal sensors, auditory sensors, or even complex bioidentification sensing units to determine fingerprints, voiceprints, or other unique identifiers of a user. The feedback unit 628 is used to generate user perceptible auditory, tactile, or visual feedback. This includes, for example, an audible "click", a vibrating element, a flashing light emitting diode, or any other suitable mechanism for indicating state change in the computer 612.

In operation, a user can log onto personal computer 612 by first bringing the stylized key 620 into a vicinity of the personal computer 612. The user simply rotates the key 620 (in the direction indicated by arrow 627) to cause the tilt/rotation sensor unit 622 to report a rotation to the processor/memory unit 626. The processor/memory unit 626 then sends (via infrared transceiver 624) various user identification, logon, and password information to computer 612 connected infrared transceiver 618. The computer 612 responds with an acknowledgement signal, causing the feedback unit 628 to generate, for example, a harsh buzzing sound if the password is incorrect or, if the password is correct and logon successful, a series of brief audible clicks similar to the sound generated by turning tumblers in a conventional mechanical lock and key system.

As those skilled in the art will appreciate, it is possible to substitute various other forms for the stylized key. A tangible computing device having the form of a garage door opener could be used, or any other suitable form sufficiently large to support the necessary processor, transceiver, and feedback electronics. In addition, various combinations of manipulation gestures such as previously discussed (e.g. squeezes, whacks, spins etc.) can be used as a substitute for a personal identification number (PIN). For example, activation of the key 620 may first require three quick squeezes or other user definable manipulation prior to tilting for login. This would provide an additional measure of security in case of loss or theft of the key 620, just as requiring a PIN number reduces misuse of bank cards.

ZOOMORPHIC DEVICE FOR COMPUTER LOGON

Zoomorphic computer devices, discussed briefly in relation to FIG. 1, are a particularly preferred form of tangible devices. Small animal or humanoid shaped zoomorphic devices can help overcome some of the interface disadvantages associated with large, abstract, and/or imposing representations such as a human head (e.g. as seen in connection with FIG. 14), while still providing better recognizability than abstract shapes (e.g. cylinders or boxes). Like a tangible device, any zoomorphic device can represent either a user or a desired physical/virtual system, providing a correspondence in which the zoomorphic device can alternatively be known as an "avatar" or "talisman", since it symbolically represents a user, a physical system, or a virtual system.

Figure 44:
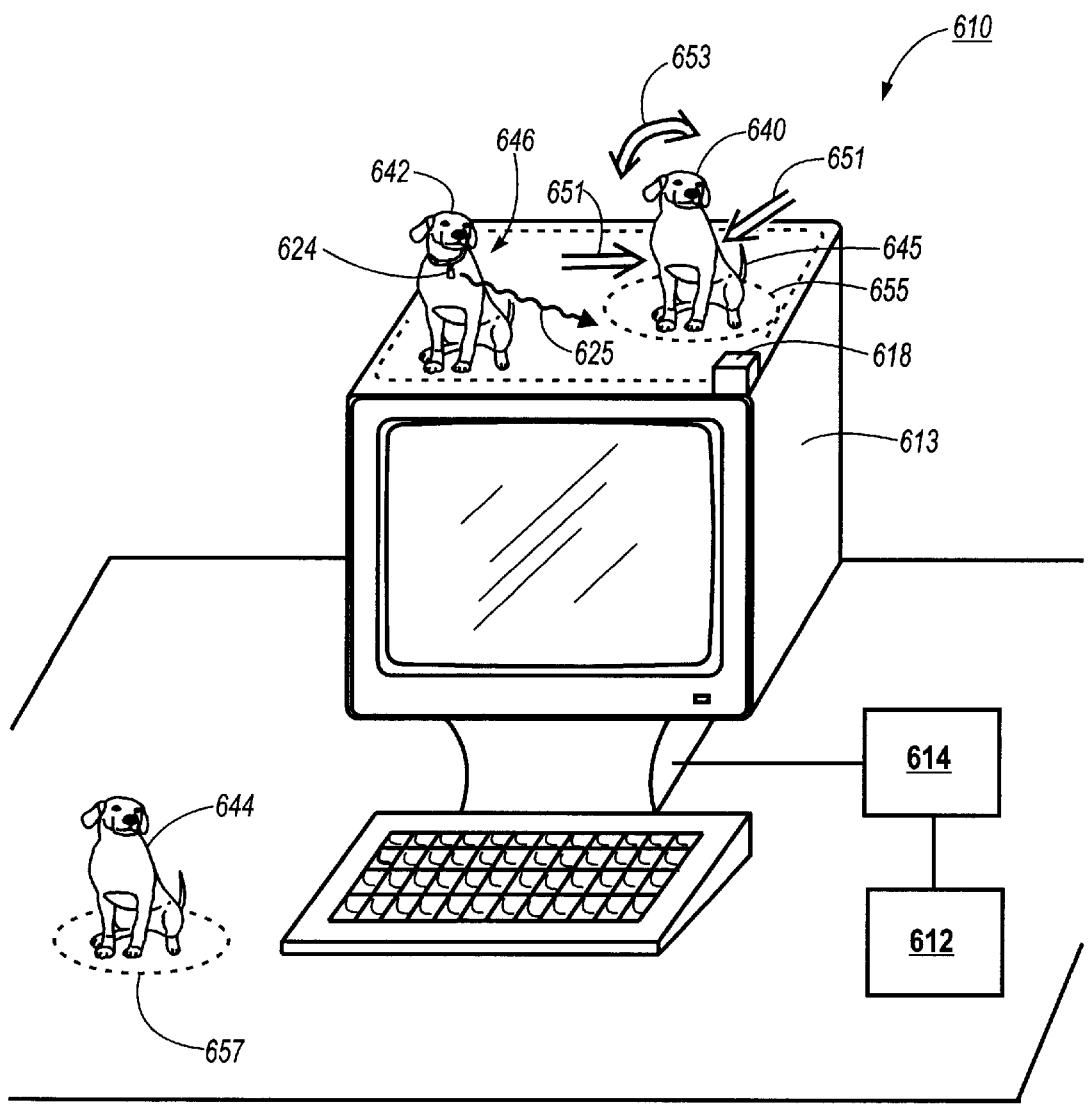
FIG. 44 is a schematic view of a zoomorphic device enabling logon to a password protected personal computer.

For example, FIG. 44 illustrates an alternative computer logon/password system that uses one or more zoomorphic devices in place of the tangible stylized key of FIG. 43. A "guard dog" 640 is a zoomorphic avatar formed to have internal electronics and transceiver 624 substantially identical to those discussed in connection with key 620 of FIG. 43. Like the stylized key 620, the guard dog can support pressure sensing mechanisms, squeeze or stretching sensors, thermal sensors, auditory sensors, or complex bioidentification sensing units to determine fingerprints, voiceprints, or other unique identifiers of a user. The guard dog can also generate user perceptible auditory, tactile, or visual feedback to allow a user to determine various system states. Feedback includes, for example, canine audio utterances such as barks and growls, or electrically activated tail wagging.

In operation, a user can log onto personal computer 612 by first bringing the guard dog 640 into a vicinity of the personal computer 612. After physically activating the guard dog 640 by a series of manipulations (e.g. squeezes 651 or rotations 653 that must be applied in a secret order), a user can place the guard dog at a predetermined position 655 on a position sensitive surface 646. Once properly activated and positioned with respect to the surface 646, the guard dog sends (via infrared signal 625 generated by infrared transceiver 624) various user identification, logon, and password information to computer 612 connected infrared transceiver 618. As previously discussed in connection with FIG. 43, the computer 612 responds with an acknowledgement signal, causing the guard dog 640 to generate, for example, a series of brief greeting barks or even electromechanically activated tail wags (or movement of other appendages such as the guard dog's paw) if the password is correct and logon successful. When a guard dog is positioned incorrectly, such as illustrated with respect to guard dog 644 placed at position 657, the guard dog can emit a warning growl, rotate in place, move slightly to another place or position, or provide other suitable indication that the logon procedure has failed.

The use of secondary or auxiliary guard dogs that interact with other guard dogs or the personal computer 612 is also contemplated within the scope of the present invention, For example, a "network" guard dog 642, having substantially identical functionality and electronics as guard dog 640, can be used to logon to network computer system 614 after guard dog 640 has enabled logon to personal computer 612. Guard dog 642 can communicate directly with the personal computer 612, or via wireless link to the guard dog 640. As will be appreciated, guard dogs (or alternative tangible computing devices or zoomorphs) can convey various types of information to each other, to personal computers, or to networked computers. For example, guard dog 640 can convey user profile information, address lists, or any other desired information to associated personal computers. In an alternative use, users can use their guard dogs to grant others having a suitable guard dog limited access to personal or network data files or applications.

MEDIA SPACE PENGUIN

Figure 45:
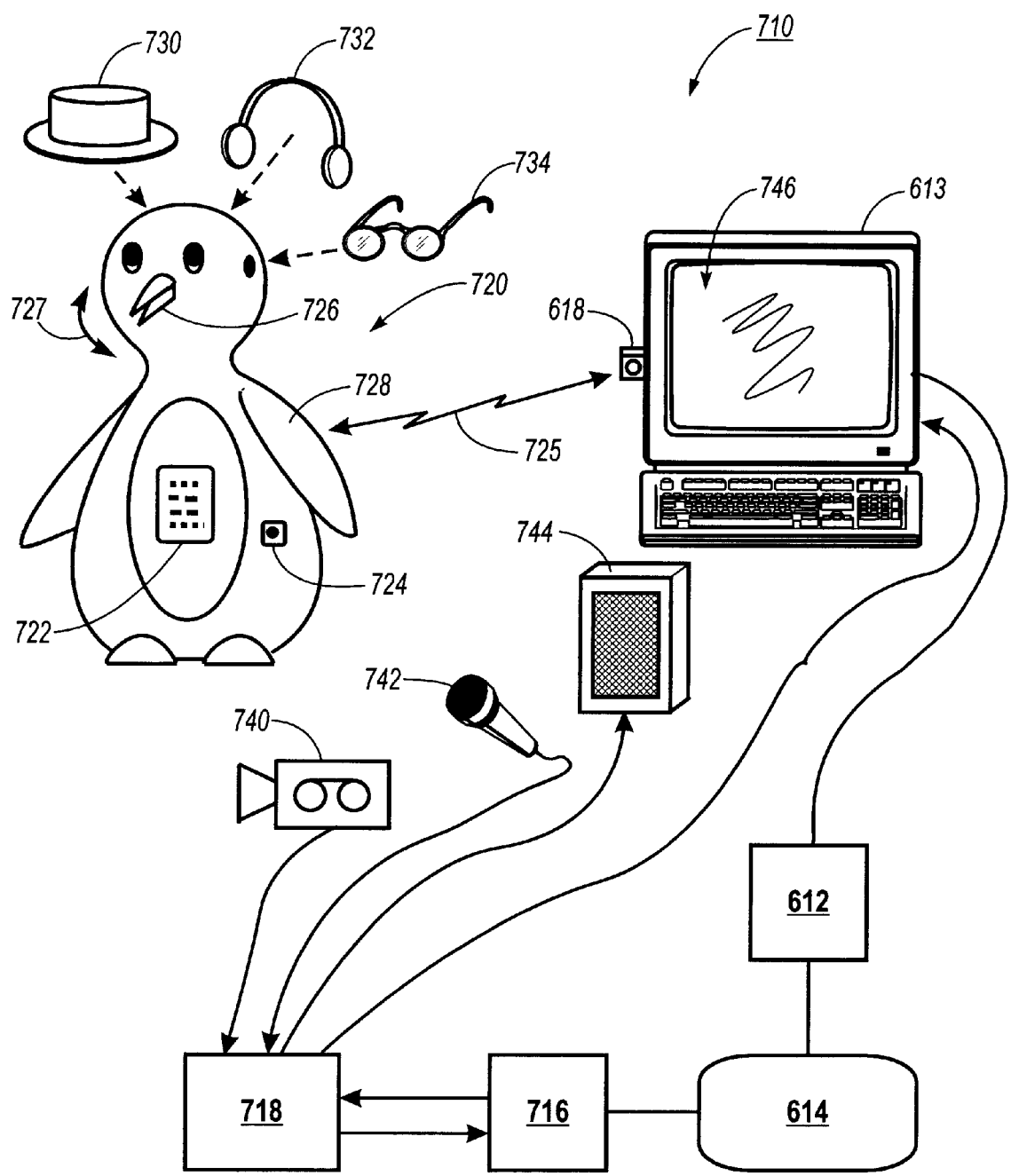
FIG. 45 is a schematic illustration of a zoomorphic device in the shape of a penguin used as an audiovisual control system.

As seen in FIG. 45, a zoomorph shaped to resemble a penguin 720 having various accessories (e.g. LCD screen 722 for status display, hat 730, ear mufflers 732, and darkened glasses 734) can be an interface to a media control system 710 using a wireless infrared transceiver 724. A media control system 710 (alternatively known as a "media space") includes a personal computer 612, monitor 613, infrared transceiver 618, and network system 614 substantially identical to that discussed previously in connection with FIGS. 43 and 44. These interact with an audiovisual server 716 connected through audio/visual switch 718 to various audiovisual input/output devices, including a camera 740, microphone 742, and audio speaker system 744. The penguin 720 has various features or physical attributes that a user can symbolically or metaphorically relate to the media control system 710. The present invention takes advantage of some typical symbolic or metaphorical linkages to enable physical manipulation, orientation, or positioning of the penguin to be interpreted as commands to the media control system 710.

For example, the penguin can be considered an avatar of the media space, and can be operated analogous to the head previously described in connection with FIG. 14. For example, covering eyes of the penguin with the darkened glasses 734 means the media space camera 740 is turned off, covering the ears means the media space turns off or disables the microphone 742, closing the penguin's mouth (as indicated by arrows 727) mutes audio output from speaker system 744

As those skilled in the art will appreciate, it is also possible to configure the penguin to be an avatar of a user. In such a case, the symbolic or metaphorical linkages are altered so that covering the eyes of penguin 720 means the user does not want to see the media space as displayed by monitor 713, covering the ears of penguin 720 means the user does not want to hear the media space from speaker system 744, and covering the mouth of penguin 720 means the user does not want to be heard, causing the microphone to be disabled.

USER NOTIFICATION ZOOMORPH

Figure 46:
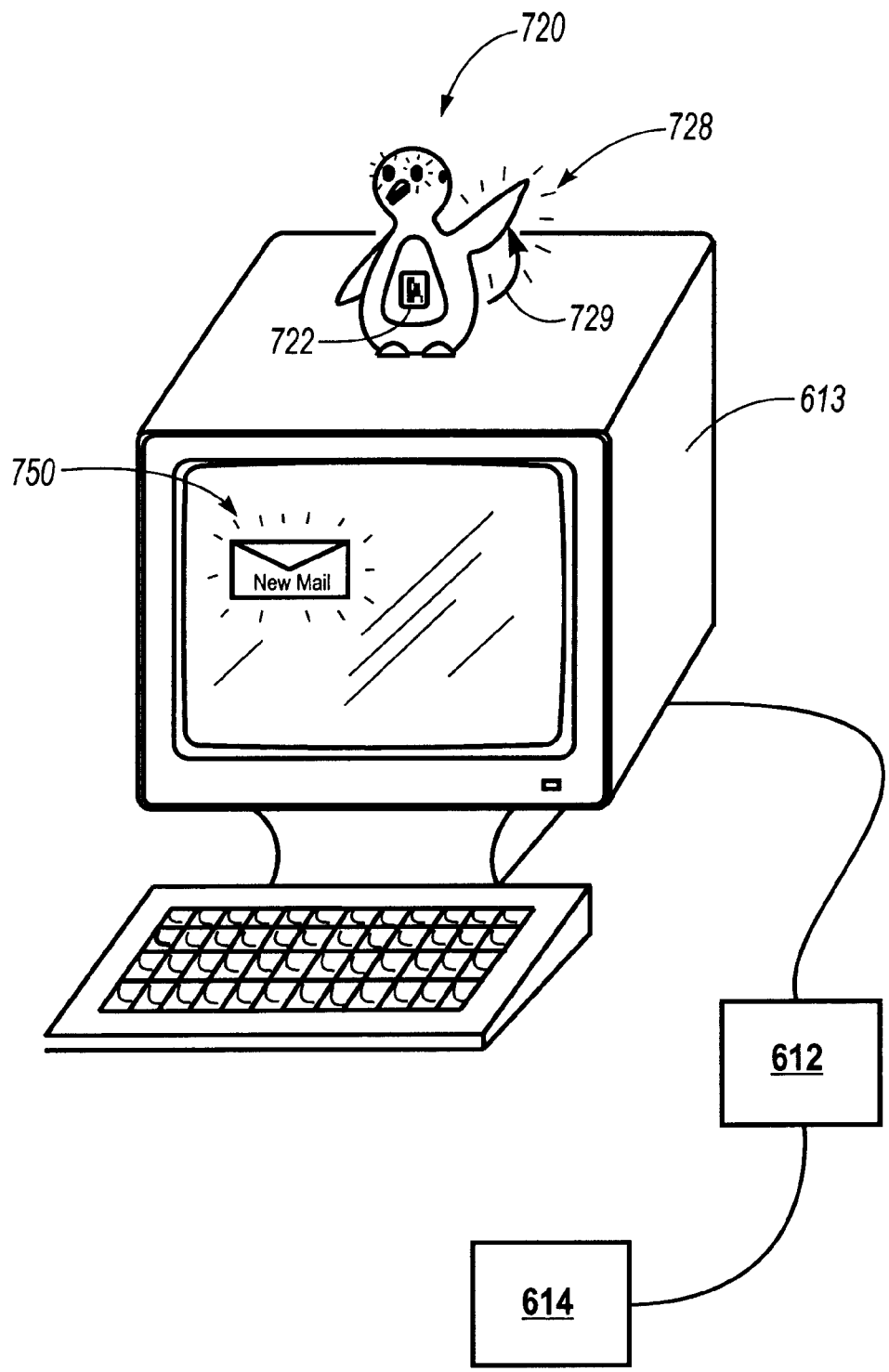
FIG. 46 is a schematic illustration of the zoomorph of FIG. 45 alternatively used in an electronic mail notification system.

In addition to acting as a user interface for controlling physical systems, a suitably modified zoomorph such as penguin can be used as for auxiliary or primary notification and messaging services. As seen in FIG. 46, the penguin 720 can be used to notify a user of receipt of electronic mail (via network 614 to personal computer 612) by raising its arm 728 (in the direction of arrow 729) using conventional electromagnetic mechanisms built into the penguin 720. Advantageously, this allows a user to determine useful information (the presence of waiting electronic mail) by the position of arm 728 without explicitly accessing a computer or viewing the monitor. Alternatively, acoustic or light output can be used to signal receipt of electronic mail, alone or in addition to physical movement of the zoomorph. A sender's name, subject header, or even the mail message in whole or in part can optionally be displayed on the screen 722 of the penguin 720, as well as being available on the monitor 613. As will be appreciated, notification services are not limited to flagging receipt of electronic mail, but can include notification or messaging for changes of state in a wide variety of physical and virtual systems. Such systems may include, but are not limited to people (a user himself or other people), environments, computational systems, or automated tracking systems. Systems may be represented by one or more physical avatars, or alternatively, a single tangible device or zoomorphic avatar may represent one or more physical or virtual systems.

As those skilled in the art will appreciate, other various modifications, extensions, and changes to the foregoing disclosed embodiments of the present invention are contemplated to be within the scope and spirit of the invention as defined in the following claims.

The claimed invention is:

1. A zoomorphic computer user interface comprising,
   a computer system directable both to accept user input to modify its system state, and to provide user output, and
   a zoomorphic unit having a recognizable zoomorphic shape and a deformable surface, wherein the zoomorphic unit is connected to the computer system to provide user input and react to computer system output, and wherein the zoomorphic unit comprises at least one sensor mesh coupled to the deformable surface to monitor deformation of the deformable surface.

2. A zoomorphic computer user interface comprising,
   a computer system directable both to accept user input to modify its system state, and to provide user output,
   a zoomorphic unit having a recognizable zoomorphic shape and a deformable surface, wherein the zoomorphic unit is connected to the computer system to provide user input and react to computer system output, and
   a reference unit connected to the computer system and available for interaction with the zoomorphic unit, with positioning of the zoomorphic unit with respect to the reference unit directably modifying system state of the computer system,
   wherein the zoomorphic unit further comprises at least one sensor mesh coupled to the deformable surface to monitor deformation of the deformable surface.

3. The zoomorphic computer user interface system of claim 2, wherein the zoomorphic unit further comprises at least one non-visual feedback unit.

4. The zoomorphic computer user interface system of claim 3, wherein the non-visual feedback unit of the zoomorphic unit further comprises at least one movable appendage.

5. The zoomorphic computer user interface system of claim 2, wherein the zoomorphic unit further comprises at least one visual feedback unit.

6. The zoomorphic computer user interface system of claim 2, wherein the zoomorphic unit further comprises at least one audio feedback unit.

7. A zoomorphic computer user interface comprising,
   a computer system providing input and output,
   a zoomorphic unit having a recognizable zoomorphic shape, at least one movable element, and a deformable surface, the zoomorphic unit being connected to the computer system, with the zoomorphic unit having a sensor mesh to detect deformation of the deformable surface and provide input to the computer system, and a feedback unit for modifying position of the movable element in response to computer system output.

8. The zoomorphic computer user interface of claim 7, wherein the at least one movable element is an appendage.

9. The zoomorphic computer user interface of claim 7, wherein computer system has a messaging application for receipt of electronic messages, and wherein the at least one movable element of the zoomorphic unit is movable in response to receipt of electronic messages.

10. The zoomorphic computer user interface of claim 7, wherein the zoomorphic unit further comprises at least one visual feedback unit.

11. The zoomorphic computer user interface system of claim 7, wherein the zoomorphic unit further comprises at least one audio feedback unit.

12. The zoomorphic computer user interface system of claim 7, wherein the zoomorphic unit further comprises a wireless transceiver for communication with the computer system.

13. A zoomorphic computer for controlling a computer system providing input and output, the zoomorphic computer comprising,
   a zoomorphic shell having a recognizable zoomorphic shape and a plurality of movable subregions,
   a transceiver attached to the zoomorphic shell for communicating with the computer system,
   a position detecting unit for determining position of the zoomorphic shell relative to the computer system, with change of position of the zoomorphic shell relative to the computer system changing state of at least one of the zoomorphic shell and the computer system,
   and a sensor mesh in contact with the zoomorphic shell, the sensor mesh detecting deformations within the movable subregions of the zoomorphic shell, and transmitting information related to multiple deformations within the movable subregions to the transceiver to provide input to the computer system.

14. The zoomorphic computer of claim 13, further comprising an audio feedback unit.

15. The zoomorphic computer of claim 13, further comprising a visual feedback unit.

16. The zoomorphic computer of claim 13, wherein position of the zoomorphic shell with respect to the computer system determines success of computer system logon.

17. The zoomorphic computer of claim 13, further comprising an audio/visual system connected to the computer system, and wherein manipulation of the zoomorphic shell controls state of the audio/visual system.

18. A zoomorphic computer for controlling a computer system providing input and output, the zoomomorphic computer comprising, a zoomormphic shell having a recognizable zoomorphic shape, a transceiver attached to the zoomorphic shell for communicating with the computer system, a position detecting unit for determining position of the zoomorphic shell relative to the computer system, with change of position of the zoomorphic shell relative to the computer system changing state of at least one of the zoomorphic shell and the computer system, a movable element attached to the zoomorphic shell, and a feedback unit supported by the zoomorphic shell and maintainable in communication with the computer system, with the feedback unit modifying a position of a movable element in response to computer system output.

19. The zoomorphic computer of claim 18, wherein the position of the movable element is modified in response to receipt of electronic messages.

\* \* \* \* \*